(12) United States Patent
Korinek

(10) Patent No.: US 9,914,555 B2
(45) Date of Patent: Mar. 13, 2018

(54) PACKAGING INSERT

(71) Applicant: Apple Inc., Cupertino, CA (US)

(72) Inventor: Michael Korinek, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 563 days.

(21) Appl. No.: 14/318,011

(22) Filed: Jun. 27, 2014

(65) Prior Publication Data

US 2015/0375893 A1 Dec. 31, 2015

(51) Int. Cl.
| | | |
|---|---|---|
| *B65D 1/34* | (2006.01) | |
| *B65D 5/50* | (2006.01) | |
| *B29C 51/26* | (2006.01) | |
| *B29K 105/00* | (2006.01) | |
| *B29K 25/00* | (2006.01) | |
| *B29L 31/00* | (2006.01) | |

(52) U.S. Cl.
CPC ............ *B65D 5/503* (2013.01); *B29C 51/264* (2013.01); *B29K 2025/06* (2013.01); *B29K 2105/256* (2013.01); *B29L 2031/712* (2013.01)

(58) Field of Classification Search
CPC .................................................. B65D 5/503
USPC ....... 206/564, 565, 583, 764, 765, 776–782, 206/557; 220/23.87, 23.89, 23.9, 23.91, 220/528, 604, 606, 633, 660; 229/163, 229/165, 120.06, 120.24, 120.29, 164, 229/170, 172, 174, 176, 406, 407, 904
See application file for complete search history.

(56) References Cited

U.S. PATENT DOCUMENTS

| | | | |
|---|---|---|---|
| 2,000,158 A | | 5/1935 | Black |
| 2,456,610 A | * | 12/1948 | Baker .................... B65D 71/72 |
| | | | 206/486 |
| 2,458,898 A | | 1/1949 | Di Addario |
| 2,663,417 A | | 12/1953 | Kincaid |
| 2,778,487 A | * | 1/1957 | Raeburn .................. B65D 5/22 |
| | | | 206/459.5 |
| 2,812,854 A | | 11/1957 | Fletcher |
| 2,979,246 A | | 4/1961 | Liebeskind |
| 3,047,137 A | | 7/1962 | Kindseth |
| 3,587,838 A | | 6/1971 | Yoshimasa |
| 3,752,384 A | | 8/1973 | Siburn |
| 3,796,304 A | | 3/1974 | Blais |
| 3,807,622 A | | 4/1974 | Belcher et al. |
| 3,822,781 A | * | 7/1974 | Braginetz .............. A45D 27/22 |
| | | | 206/228 |
| 4,019,636 A | | 4/1977 | Wise |
| 4,294,349 A | * | 10/1981 | Ibsen ................... A61C 19/005 |
| | | | 206/523 |
| 4,482,054 A | | 11/1984 | Gardner |

(Continued)

*Primary Examiner* — Luan K Bui
(74) *Attorney, Agent, or Firm* — Sterne, Kessler, Goldstein & Fox P.L.L.C.

(57) ABSTRACT

Packaging used to hold and ship consumer products may include a packaging insert having an exterior profile that substantially matches an interior profile of the box it is placed in during assembly. In some embodiments, the packaging insert may be formed using a thermo-forming process that inhibits the formation of defects, such as stress marks, located near or on the corners of the packaging insert. The packaging insert may include a side wall having a plurality of extended portions and a plurality of abbreviated portions. In some embodiments, the packaging insert may include a plurality of flaps rotatably connected to a body of the packaging insert.

24 Claims, 22 Drawing Sheets

(56) References Cited

U.S. PATENT DOCUMENTS

| | | | | |
|---|---|---|---|---|
| 4,742,916 | A | 5/1988 | Galea | |
| 4,801,018 | A | 1/1989 | Wilde | |
| 4,824,041 | A | 4/1989 | Myers | |
| 4,869,369 | A | 9/1989 | Turngren | |
| 4,877,673 | A | 10/1989 | Eckel et al. | |
| 4,883,179 | A | 11/1989 | Dionne | |
| 5,071,009 | A | 12/1991 | Ridgeway | |
| 5,129,514 | A | 7/1992 | Lilley, Jr. | |
| 5,335,770 | A | 8/1994 | Baker et al. | |
| 5,423,449 | A * | 6/1995 | Gordon | B65D 77/2056 206/557 |
| 5,577,606 | A * | 11/1996 | Schwentuchowski | B65D 73/0085 206/327 |
| 5,657,955 | A | 8/1997 | Adams | |
| 5,711,426 | A | 1/1998 | Kuhn et al. | |
| 6,073,770 | A | 6/2000 | Park | |
| 6,142,304 | A | 11/2000 | Moren et al. | |
| 6,261,653 | B1 | 7/2001 | Smith | |
| 6,467,623 | B1 | 10/2002 | Lewis et al. | |
| 6,520,337 | B2 | 2/2003 | Smith | |
| 6,527,123 | B1 * | 3/2003 | Ausaf | A47J 47/14 206/541 |
| 6,629,608 | B2 | 10/2003 | Hurley et al. | |
| 6,705,469 | B2 | 3/2004 | Slot | |
| 6,722,502 | B1 | 4/2004 | Newman | |
| 6,840,381 | B2 | 1/2005 | Stephens | |
| 6,875,405 | B1 * | 4/2005 | Mathus | B01L 9/06 206/446 |
| 7,014,047 | B2 | 3/2006 | Stapleton | |
| 7,097,037 | B1 * | 8/2006 | Keffeler | B65D 83/0445 206/528 |
| 7,216,765 | B2 | 5/2007 | Markert et al. | |
| 7,306,101 | B2 | 12/2007 | Murry | |
| 7,331,465 | B2 * | 2/2008 | Parrington | B65D 77/003 206/583 |
| 7,383,952 | B2 | 6/2008 | Kruelle et al. | |
| 7,866,478 | B2 | 1/2011 | Rohrbach et al. | |
| 8,056,725 | B2 * | 11/2011 | Doster | B65D 5/4233 206/232 |
| 8,727,123 | B1 * | 5/2014 | Roberts | B65D 81/07 206/521 |
| 8,844,726 | B2 | 9/2014 | Andre et al. | |
| 2003/0038054 | A1 | 2/2003 | Hurley et al. | |
| 2004/0262193 | A1 | 12/2004 | Korhonen | |
| 2005/0211600 | A1 | 9/2005 | Saito | |
| 2006/0243636 | A1 | 11/2006 | Robichaud et al. | |
| 2007/0051662 | A1 | 3/2007 | Millar-Sax et al. | |

* cited by examiner

PACKAGING INSERT

FIELD

The described embodiments relate generally to packaging for a consumer product. More particularly, the embodiments relate to a packaging insert having a profile that matches the profile of the box it is placed in and a packaging insert that free from stress marks that may occur during manufacturing.

BACKGROUND

Packaging for consumer products may be an important marketing tool used to attract and retain customers. Packaging should be aesthetically appealing, but at the same time direct a consumer's attention to the product it is designed to hold. Packaging having defects or imperfections can draw the consumer's attention away from the product it is holding. Defects or imperfections that draw a consumer's attention may negatively impact the consumer's impression of the product and/or the product's brand.

SUMMARY

Packaging for consumer products protects products from damage and facilitates brand recognition. Effective packaging can be an important marketing tool used to attract customers. Packaging should hold and display a product in an aesthetically appealing way that catches a consumer's attention. Effective packaging should catch the consumer's attention and focus that attention of the product rather than the packaging itself.

Packaging containing defects may attract negative attention to the packaging and may give the consumer a negative impression of the product and or the product's brand. On the other hand, packaging that is flawless in character may boost a product's or a brand's reputation, thereby attracting new customers and retaining previous customers.

The packaging according to embodiments described herein, or elements thereof, accomplish one or more of these and other objectives.

Some embodiments include a packaging insert including a top wall having an outer perimeter and a side wall disposed about the top wall outer perimeter, the top wall and the side wall may together define a plurality of vertex corners, and the side wall may have a plurality of edge corners extending from the vertex corners. The side wall may have a plurality of extended portions and a plurality of abbreviated portions located at the edge corners. The abbreviated portions may have a first maximum height, the extended portions may have a second maximum height, and the first maximum height may be less than the second maximum height. In some embodiments, the first maximum height is between 2.5 mm and 5.5 mm.

In some embodiments, the packaging insert also includes a plurality of transition portions, each located between an abbreviated portion and an extended portion and having a slanted wall connecting the abbreviated portion and extended portion.

In some embodiments, the packaging insert is a single integrally formed piece. It may be made of polystyrene. In some embodiments, the side wall, the top wall, and the corners of the packaging insert have no stress marks. In some embodiments, the top wall defines a cavity for receiving a product.

Some embodiments include packaging for a product, the product being in contact with the top wall of a packaging insert. The packaging may include a base box having a horizontal wall with an outer perimeter and a vertical wall disposed about the horizontal wall outer perimeter. The horizontal wall and the vertical wall may together define a cavity, which may have a plurality of edge corners defined by the vertical wall. The base box may be configured to receive at least a portion of the packaging insert and the edge corners of the packaging insert may be spaced apart from the edge corners of the cavity by no more than 0.75 mm when the packaging insert and the base box are assembled together.

In some embodiments, the edge corners of the packaging insert have the same shape and size as the edge corners of the cavity, and may contact the edge corners of the cavity when the packaging insert and the base box are assembled together.

In some embodiments, the vertical wall has a third maximum height. In some embodiments, the second maximum height of the extended portions is equal to or no greater than the third maximum height.

In some embodiments, the side wall of the packaging insert contacts the vertical wall of the base box. In some embodiments, the side wall of the packaging insert may be adhesively bonded to the vertical wall of the base box. In some embodiments, the base box receives the entire packaging insert.

Some embodiments include a method of making a packaging insert, the method including molding a preform by pressing a plastic sheet between a mold and a plug, the preform having a top wall with an outer perimeter and a side wall disposed about the top wall outer perimeter. The top wall and the side wall may together define a plurality of vertex corners. The preform may also include a plurality of corner extensions extending around the vertex corners. The method may further include releasing the preform from the mold and the plug and cutting the preform to remove the corner extensions, thereby forming the packaging insert. In some embodiments, a cutting die and a cutting punch are used to remove the corner extensions.

In some embodiments, the packaging insert side wall may have a plurality of edge corners extending from the vertex corners. The side wall may also have a plurality of extended portions and may have a plurality of abbreviated portions located at the edge corners. The abbreviated portions may have a first maximum height, the extended portions may have a second maximum height, and the first maximum height may be less than the second maximum height.

In some embodiments, the method forms a packaging insert where the side wall, the top wall, and the corners have no stress marks.

In some embodiments, the packaging insert is made of polystyrene. The preform may be molded using a thermoforming technique by applying heat while pressing the plastic sheet between the mold and the plug.

Some embodiments include a packaging insert including a body having a top surface interrupted by a cavity formed therein, the cavity extending below the top surface, and a plurality of flaps rotatably coupled to a perimeter of the body. The body may include a recess for receiving a product. The flaps may be configured to rotate between a first position and a second position, where in the second position they are oriented perpendicular the body and extend below the cavity.

In some embodiments, the body and the flaps are a single integrally formed piece. The flaps may rotate about hinges located along a perimeter of the body and the hinges may be formed by cuts in the material of the body.

In some embodiments, the packaging insert includes four flaps rotatably coupled to the perimeter of the body, each flap having a side edge. In some embodiments, the side edges of adjacent flaps contact each other when the flaps are in the second position. In some embodiments, the body and the plurality of flaps define a plurality of vertex corners having a plurality of edge corners extending from the vertex corners when the flaps are in the second position.

Some embodiments include packaging for a product, the product being in contact with the top wall of the packaging insert. The packaging may include a base box having a horizontal wall with an outer perimeter and a vertical wall disposed about the horizontal wall outer perimeter. The horizontal wall and the vertical wall may together define a cavity, which may have a plurality of edge corners defined by the vertical wall. The base box may be configured to receive at least a portion of the packaging insert when the flaps are parallel to the vertical wall (i.e., in the second position).

In some embodiments, the flaps contact the vertical wall of the base box when the packaging insert and the base box are assembled together. In some embodiments, the flaps have a height less than or equal to a height of the vertical wall.

In some embodiments, the body and the plurality of flaps define a plurality of edge corners of the packaging insert when the flaps are in the second position and the edge corners of the packaging insert have the same shape and size as the edge corners of the base box, and may contact the edge corners of the cavity when the packaging insert and the base box are assembled together.

Some embodiments include a method of assembling packaging for a product. The method may include applying adhesive to flaps of a body of a packaging insert. The flaps may be rotatably coupled to a perimeter of the body and being configured to rotate between a first position and a second position, where the flaps are oriented perpendicular the body in the second position. The method may also include rotating the flaps into the second position and placing the packaging insert with flaps in the second position into a base box. The base box may include a horizontal wall having an outer perimeter and a vertical wall disposed about the horizontal wall outer perimeter. The method may further include adhering the packaging insert to the vertical wall of the base box by removing a release liner from the adhesive after the packaging insert is placed into the base box.

BRIEF DESCRIPTION OF THE DRAWINGS

The disclosure will be readily understood by the following detailed description in conjunction with the accompanying drawings, where like reference numerals designate like structural elements, and in which.

DETAILED DESCRIPTION

Figure 1:
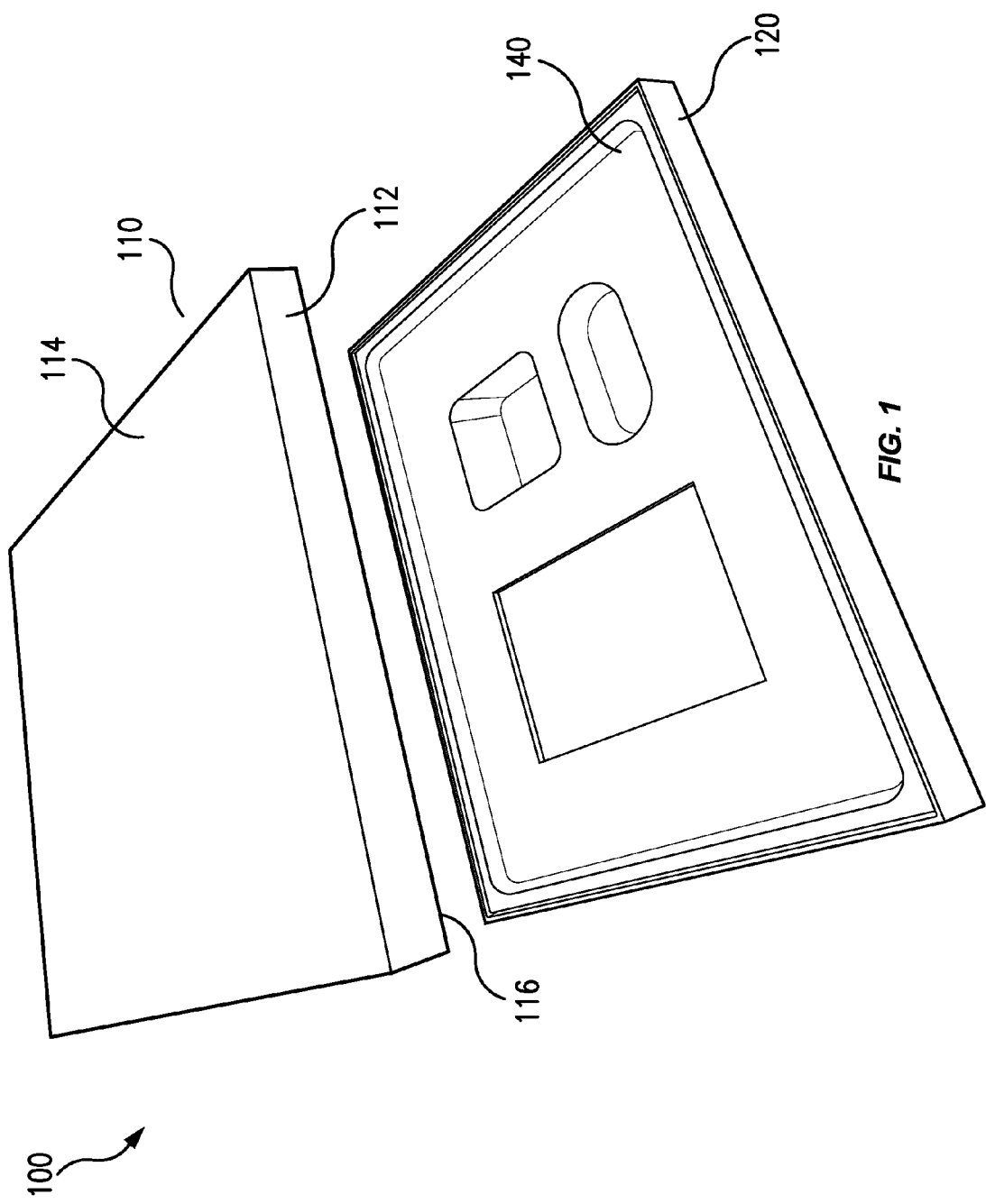
FIG. 1 shows a perspective view of packaging according to an embodiment.

Reference will now be made in detail to representative embodiments illustrated in the accompanying drawings, in which like reference numerals are used to indicate identical or functionally similar elements. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The packaging described herein may be used to hold and ship items, such as, for example, consumer products. The packaging is structurally robust and protects the product during shipping and handling. The packaging described herein may include a packaging insert having an exterior profile that substantially matches an interior profile of the box it is placed in during assembly. In other words, the exterior perimeter and corners of the packaging insert may substantially match the interior perimeter and corners of the box.

The packaging insert described herein may be formed using a thermo-forming process that inhibits the formation of defects, such as stress marks. Such stress marks may occur using conventional formation methods, especially where the packaging insert is formed to match a small radius, such as a perpendicular corner, of the box that contains it. This can be due to difficulty in maintaining consistent material properties in and around corners and small radiuses of a mold during the formation process, especially for thin material such as may be used for a packaging insert. The inconsistent properties can result in stress marks, which may manifest as light areas or discolorations in the insert material.

Specifically, in some embodiments the thermo-forming process and packaging insert configuration of embodiments of the present invention may inhibit the formation of defects located near or on the corners of the packaging insert. The packaging insert may include a side wall having a plurality of extended portions, a plurality of abbreviated portions, and spaces located at each corner of the packaging insert. The abbreviated portions and spaces may aid in preventing defects near or on the corners, and the extended portions may provide structural support for the packaging insert and the packaging.

In some embodiments, the packaging insert described herein may include a plurality of flaps rotatably connected to a body of the packaging insert. The flaps may be configured to fold into a quasi-continuous side wall of the packaging insert. The folded flaps may provide for a packaging insert having an exterior profile that substantially matches an interior profile of the box it is placed in during assembly.

These and other embodiments are discussed below with reference to FIGS. 1-23. However, those skilled in the art will readily appreciate that the detailed description given herein with respect to these figures is for explanatory purposes only and should not be construed as limiting.

Some embodiments of the present invention include packaging 100 for protecting and displaying consumer products. As shown in FIG. 1, packaging 100 may include a lid 110, a base box 120, and a packaging insert 140. Lid 110 may include a side wall 112, a top wall 114, and a lid edge 116. When assembled in a closed configuration, lid 110 may be placed over base box 120 and may receive at least a portion of base box 120. In some embodiments, lid 110 may receive the entire base box 120.

Figure 2:
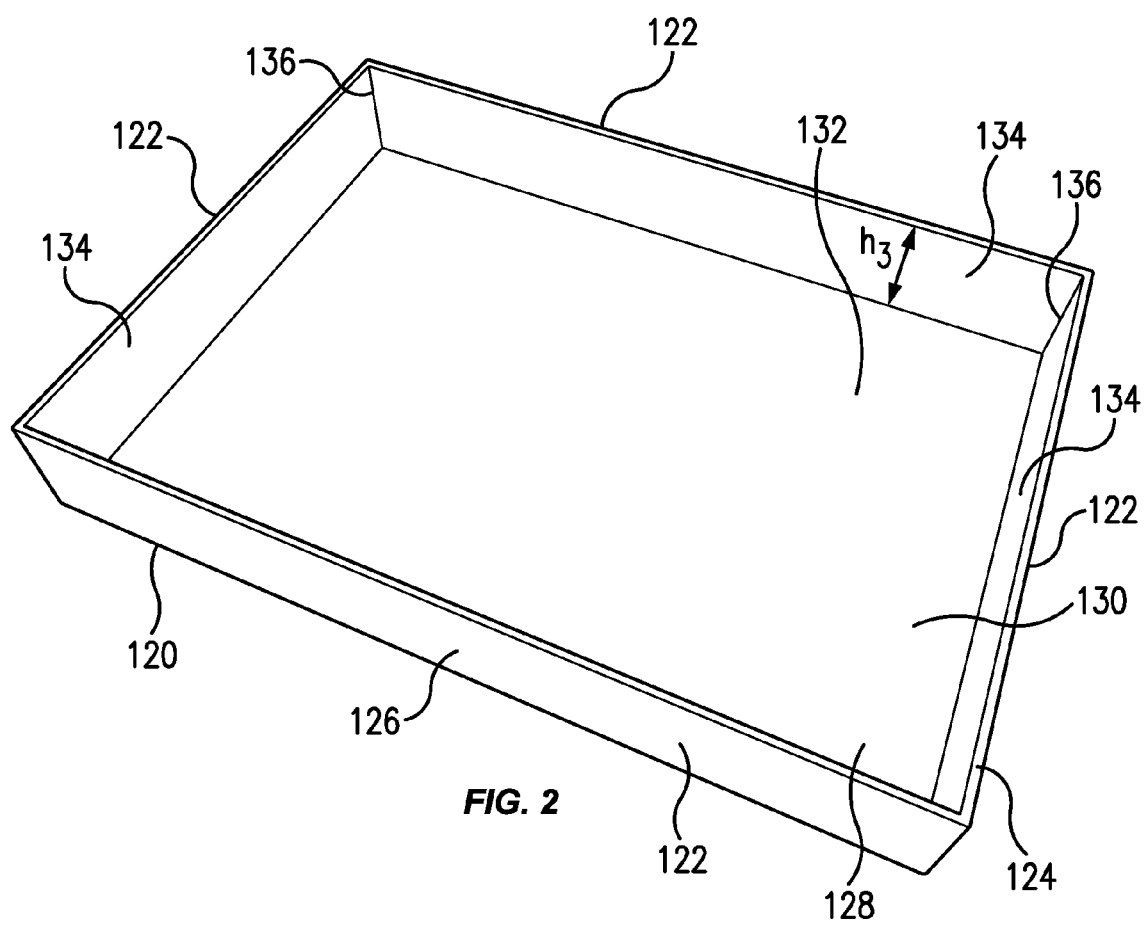
FIG. 2 shows a perspective view of a packaging base box according to an embodiment.

As shown in FIG. 2, base box 120 may include a cavity 130 defined by a horizontal wall 128 and a vertical wall 122, vertical wall 122 extending from horizontal wall 128 to an edge 124. Cavity 130 may be configured to receive at least a portion of packaging insert 140. Cavity 130 includes a cavity bottom surface 132 and a cavity side surface 134. Vertical wall 122 includes an exterior side surface 126. When lid 110 is placed over base box 120, at least a portion of exterior side surface 126 may contact an interior side surface of lid 110. In some embodiments, the height of lid 110 may be such that lid edge 116 aligns with the underside of horizontal wall 128 of base box 120 (i.e., the surface of horizontal wall 128 opposite cavity bottom surface 132) when lid 110 is fully seated over base box 120.

Vertical wall 122 of base box 120 may define a plurality of edge corners 136. In some embodiments, vertical wall 122 may define four edge corners 136 formed at right angles (i.e., 90° angles). In some embodiments, edge corners 136 have a radius of curvature ($R_1$) approaching zero. In some embodiments, the radius of curvature ($R_1$) may be zero or as close to zero as the manufacturing process and materials used to produce base box 120 allow. A radius of curvature at a corner between two elements, as used herein, does not require an actual curve at the intersection of the two elements; for example a radius of curvature of zero describes an intersection of two straight elements without a curve in between. The radius of curvature ($R_1$) of edge corners 136 and a radius of curvature ($R_2$) of edge corners 146 on packaging insert 140 will be described further below in reference to FIG. 7. In some embodiments, base box 120 may be made of cardboard. In some embodiments, base box 120 may be made of plastic. Suitable plastics include, for example, polyethylene, polypropylene, polyurethane, polystyrene, etc.

Boxes for consumer packaging, such as base box 120, having corners formed at right angles may be a desirable feature of the packaging (e.g., for its aesthetic appeal, familiarity, simplicity, and/or efficient use of space). However, it may be difficult to form a plastic packaging insert having corners that are free from defects and that substantially match the corners on the box. This problem may arise from high stresses occurring within a material when that material is formed around corners in a mold. During forming, corners having a small radius of curvature create high stresses within a material may cause defects. This problem may be particularly prevalent in manufacturing processes that draw thin sheets of plastic (e.g., between 1 mm and 2 mm thick) around corners to form a desired shape (e.g., thermoforming as described below). Packaging insert 140, described below, includes features that help inhibit the formation of defects, especially during a manufacturing process that draws a thin sheet of plastic into the desired shape (e.g., thermo-forming processes).

Figure 3:
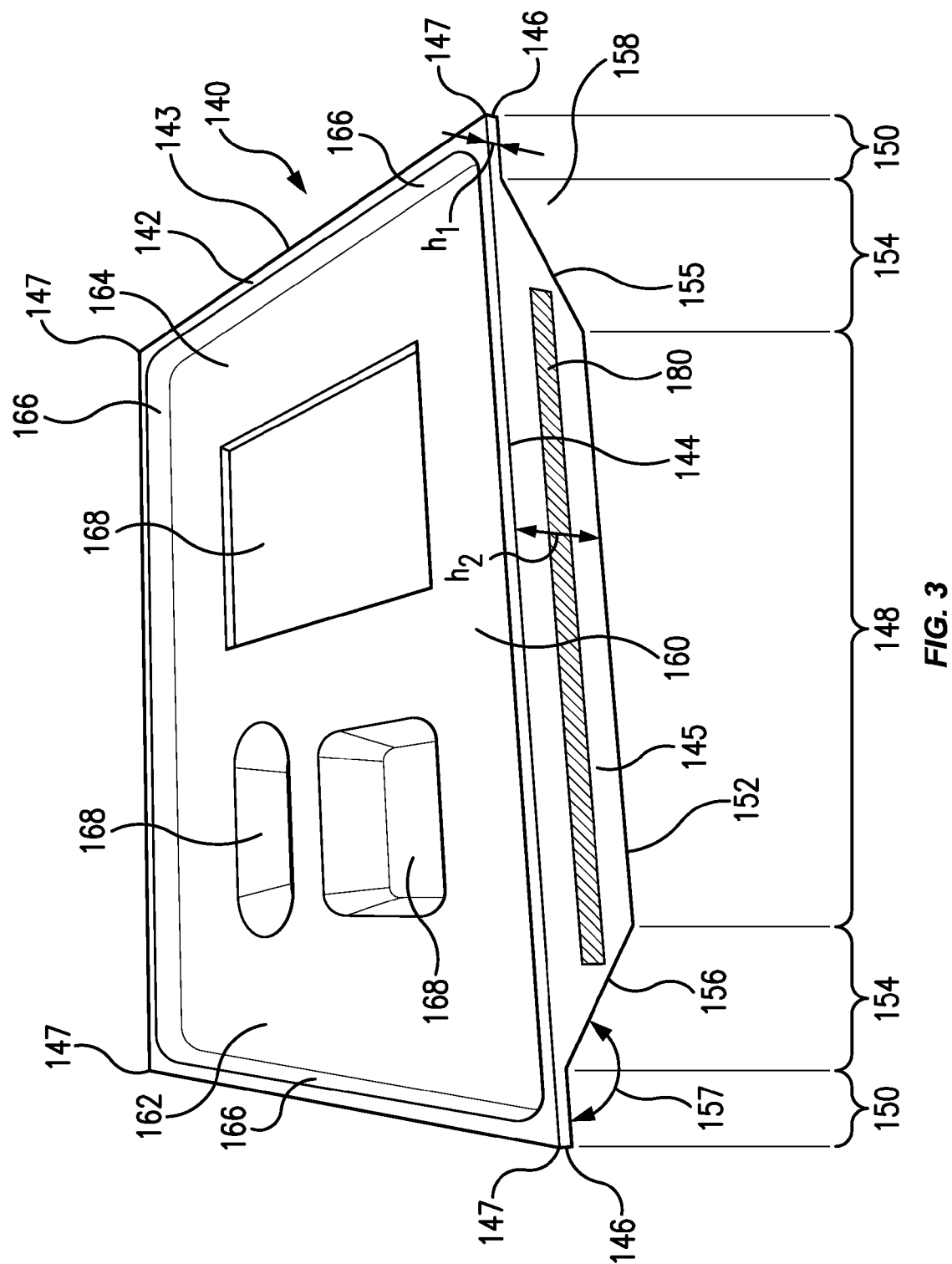
FIG. 3 shows an upper perspective view of a packaging insert according to an embodiment.

FIGS. 3-6 show a packaging insert 140 according to an embodiment. As shown in FIG. 3, packaging insert 140 may include a top wall 142 having an outer perimeter 143 and surrounded by a side wall 144, the top wall 142 and side wall 144 defining a plurality of vertex corners 147 and a plurality of edge corners 146 extending from vertex corners 147. As used herein, "corner" can refer to a "vertex corner" or an "edge corner." A "vertex corner" refers to a corner where three or more surfaces meet. An "edge corner" refers to a corner where two surfaces meet.

Side wall 144 may include a side wall surface 145, a plurality of extended portions 148 separated by a plurality of abbreviated portions 150, and a side wall edge 152. Abbreviated portions 150 may be located at each edge corner 146. Side wall 144 may be oriented substantially perpendicular to top wall 142. Abbreviated portions 150 may have a first height ($h_1$) and extended portions 148 may have a second height ($h_2$), the first height being less than the second height. In some embodiments, the height of extended portions 148 may be equal to the height (third height $h_3$) of cavity side surface 134 of base box 120. In such embodiments, at least a portion of top wall 142 may sit flush with edge 124 of base box 120 when packaging insert 140 is fully seated into base box 120. As used herein, parts that are "flush" may have surfaces that are aligned within a deviation of +/−1/16 of an inch, which is generally perceived as flush to a casual observer. In some embodiments, the height of extended portions 148 is no greater than the height of cavity side surface 134.

In some embodiments, to minimize stress marks in the insert corners, the height ($h_1$) of abbreviated portions 150 is between 3 mm and 5 mm with a tolerance of +/−0.5 mm. In some embodiments, the height ($h_1$) of abbreviated portions 150 is 3 mm+/−0.5 mm. In some embodiments, the height ($h_1$) of abbreviated portions 150 is 5 mm+/−0.5 mm. In some embodiments, to maintain packaging insert 140's position within base box 120, the height ($h_2$) of extended portions 148 is between 10 mm and 100 mm. In some embodiments, the height ($h_2$) of extended portions 148 is between 30 mm and 55 mm. In some embodiments, the height ($h_2$) of extended portions 148 is 35 mm+/−0.2 mm. In some embodiments, the height ($h_2$) of extended portions 148 is 40 mm+/−0.2 mm. In some embodiments, the height ($h_2$) of extended portions 148 is 50 mm+/−0.2 mm. In some embodiments, the height ($h_1$) of abbreviated portions 150 is less than 50% the height ($h_2$) of extended portions 148. In some embodiments, the height ($h_1$) of abbreviated portions 150 is less than 25% the height ($h_2$) of extended portions 148. In some embodiments, the height ($h_1$) of abbreviated portions 150 is less than 10% the height ($h_2$) of extended portions 148.

Again referring to FIG. 3, side wall 144 may include a plurality of transition portions 154 connecting extended portions 148 and abbreviated portions 150. Side wall 144 may include a transition portion 154 located between extended portion 148 and abbreviated portion 150. Transition portions 154 may be defined by slanted walls 155. As such, transition portions 154 may have a varying height increasing from an abbreviated portion 150 to an extended portion 148. Slanted walls 155 may have angle 157 between 90 and 180° relative to top wall 142 (i.e. in a planar direction perpendicular to top wall 142 and parallel to side wall 144). In some embodiments angle 157 may be between 130° and 140°. In some embodiments angle 157 is 135°. The location of extended portions 148, abbreviated portions 150, and transition portions 154 creates spaces 158 in side wall 144 located below edge corners 146. In some embodiments, side wall edge 152 may include a lip 156 running along side wall edge 152 for added structural stability. In some embodiments, extended portions 148 may have a length that is greater than 50% of the length of side wall 144 between adjacent edge corners 146. In some embodiments, extended portions 148 may have a length that is greater than 67% of the length of side wall 144 between adjacent edge corners 146. In some embodiments, packaging insert 140 may not have transition portions 154 and, instead of slanted wall 155, side wall 144 may include a vertical edge between extended portions 148 and abbreviated portions 150.

Abbreviated portions 150 on side wall 144 may help prevent the formation of stress marks on or near corners 146 and 147 during manufacturing. For example, as described below in reference to FIGS. 10-13, abbreviated portions 150 help prevent the formation of stress marks on or near corners 146 and 147 for a packaging insert 140 made using a thermo-forming process by reducing the vertical distance that a plastic sheet must be drawn at or near the corners. Drawing plastic around a vertex corner (e.g., vertex corner 242 of plug 230) having a small radius of curvature combined with a large vertical draw increases the potential for stress marks forming at or near the corners. The formation of stress marks may result from the combined stresses of drawing the plastic around a vertex corner and drawing it vertically at the same time. Abbreviated portions 150 prevent the formation of stress marks by creating a vertical draw that is substantially less at the corners 146 and 147 of packaging insert 140 during a forming process (e.g., by thermoforming) when compared to other portions of side wall 144. Reducing the length of the vertical draw reduces the total stress within the plastic at or near the corners during forming. Abbreviated portions 150 may be formed using specially designed molds as described below in reference to FIGS. 10-13.

Abbreviated portions 150 have been found to prevent stress marks on packaging of all colors. This may be especially significant for packaging inserts 140 having a dark color, such as black, blue, or red, where stress marks may be most noticeable because stress marks in plastic may result in thin spots and/or a color change in the material. Thin spots may result in a spot that is more transparent than the surrounding material. Color changes may cause light-colored (e.g., white) streaks or spots to form on a material. These transparent spots and/or color changes may be more noticeable against a dark color versus a light color. While abbreviated portions 150 prevent stress marks, extended portions 148 provide structural support for packaging insert 140 and packaging 100 as a whole. In some embodiments, at least a portion of side wall surface 145 may include adhesive 180 for adhering packaging insert 140 to base box 120 when packaging insert 140 and base box 120 are assembled. Adhesive 180 may include, for example, glue or tape (with or without a release liner).

Top wall 142 may include a product surface 160 for holding a product 190. Product surface 160 may include a cavity 162 for receiving at least a portion of product 190. Cavity 162 may include a cavity bottom surface 164 and a cavity side surface 166. In some embodiments, cavity 162 is shaped such that it conforms to the exterior shape of product 190. In some embodiments, cavity 162 is shaped such that the bottom of product 190 rests on cavity bottom surface 164 and a top surface 192 of product 190 sits flush with top wall 142. The particular size and shape of cavity 162 shown in the figures is exemplary—it may be modified to correspond to at least some portion of the exterior shape of a product intended to be packaged. As shown in FIG. 3, cavity 162 may include at least one recess 168 for housing accessories, such as, for example, a power cord, a USB cord, or an instruction manual.

Figure 4:
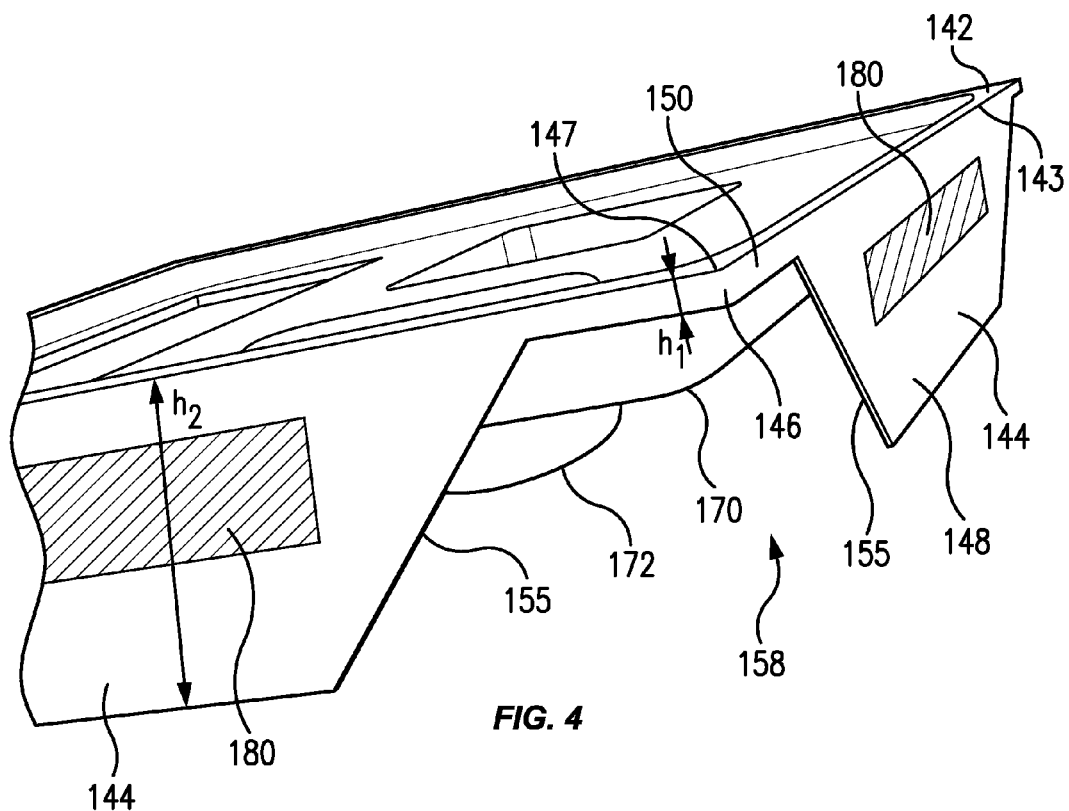
FIG. 4 shows an upper perspective view of a packaging insert according to an embodiment.
Figure 5:
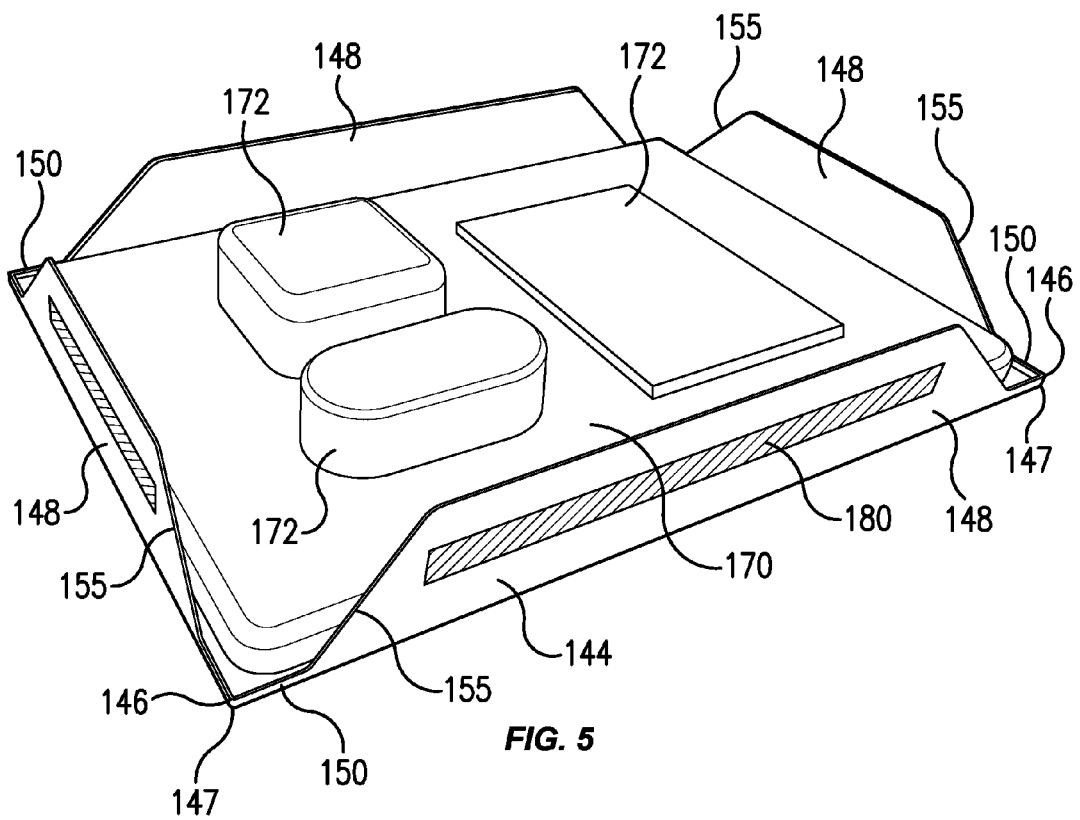
FIG. 5 shows a lower perspective view of a packaging insert according to an embodiment.

As shown in FIGS. 4 and 5, the underside of packaging insert 140 may include a bottom surface 170. Bottom surface 170 may have projections 172 corresponding to recesses 168 in cavity 162. Bottom surface 170 and/or projections 172 may extend below abbreviated portions 150. In some embodiments, at least one of the projections 172 may have a height equal to the height ($h_1$) of extended portions 148 such that at least one the projection 172 contacts cavity bottom surface 132 of base box 120 when packaging insert 140 and base box 120 are assembled (see FIG. 6). In some embodiments, at least a portion of projection 172 may include adhesive for adhering packaging insert 140 to base box 120 when packaging insert 140 and base box 120 are assembled. Such adhesive may include, for example, glue or tape (with or without a release liner).

Figure 6:
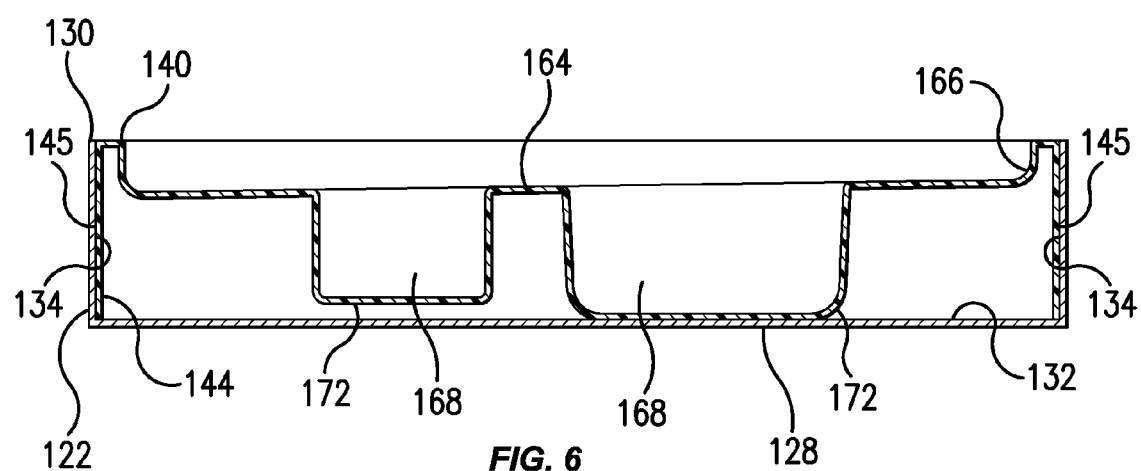
FIG. 6 shows a cross-sectional view of an assembled packaging insert and a base box according to an embodiment.

FIG. 6 shows a cross-sectional view of an assembled base box 120 and packaging insert 140 according to an embodiment. As shown in FIG. 6, base box 120 may receive the entire packaging insert 140. When assembled, at least a portion of side wall surface 145 may be in direct contact with cavity side surface 134 of base box 120. Contact between side wall surface 145 and cavity side surface 134 may be maintained by adhesive 180. Contact and/or adhesive between side wall surface 145 and cavity side surface 134 may increase the robustness of packaging 100 and minimize undesired movement or shifting of packaging insert 140 and/or product 190 during shipping and handling.

When base box 120 and packaging insert 140 are assembled, edge corners 136 of base box 120 and edge corners 146 of packaging insert 140 may contact each other. In some embodiments, edge corners 136 may have substantially the same shape as edge corners 146, thereby facilitating close proximity between them. Such close proximity, approximating and including contact between edge corners 136 and edge corners 146, minimizes gaps between packaging insert 140 and base box 120. Minimizing gaps between packaging insert 140 and base box 120 may make packaging insert 140 and base box 120 look more like a single, solid piece. Such a configuration may increase the aesthetic appeal of packaging 100 and focus a consumer's attention on product 190 rather than aspects of packaging 100. Edge corners 136 and 146 that have radii of curvature that are substantially equal or only minimally different result in the smallest gaps between edge corners 136 and 146, and are achievable using the inventive structure and techniques described herein. In some embodiments, the gap between an edge corner 136 and an edge corner 146 may be no greater than 0.75 mm. In some embodiments, the gap between an edge corner 136 and an edge corner 146 may be 0.25 mm.

Figure 7:
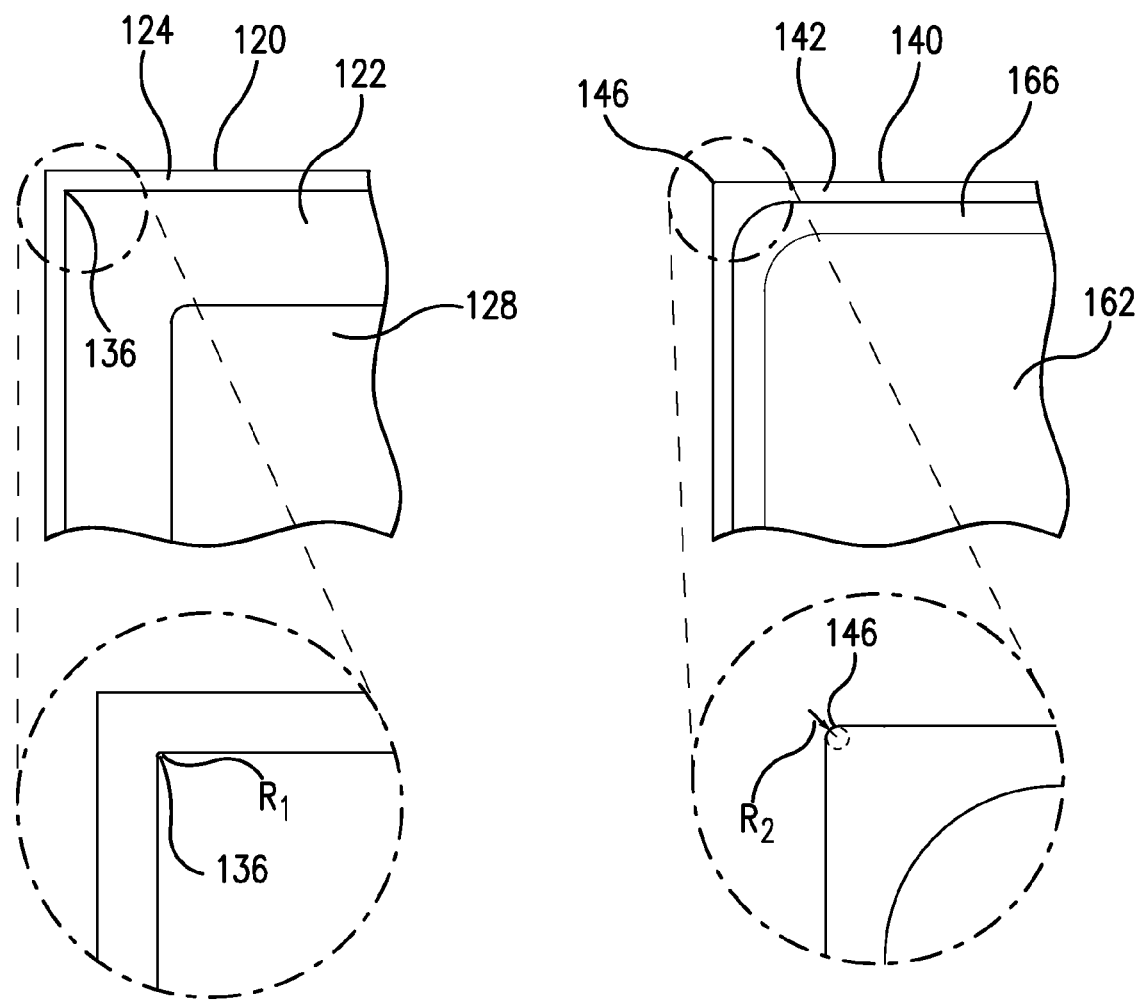
FIG. 7 shows an enlarged view of corner of a base box and a corner of a packaging insert according to an embodiment.

FIG. 7 illustrates the radius of curvature ($R_1$) of an edge corner 136 of base box 120 and the radius of curvature ($R_2$) of an edge corner 146 of packaging insert 140. In some embodiments, edge corner 146 and vertex corner 147 have the same radius of curvature. In some embodiments, edge corners 136 and edge corners 146 have a radii of curvature ($R_1$ and $R_2$) approaching zero. In some embodiments, the radii of curvature ($R_1$ and $R_2$) may be as close to zero as the manufacturing process and materials used to produce base box 120 and packaging insert 140 allow. In some embodiments, the radius of curvature ($R_2$) of edge corners 146 is equal to the radius of curvature ($R_1$) of edge corners 136. In some embodiments, the radius of curvature ($R_2$) of edge corners 146 is greater than the radius of curvature ($R_1$) of edge corners 136 by less than 2 mm. In some embodiments, the radius of curvature ($R_1$) of edge corners 136 is 0 (i.e., corners 136 are formed at 90° angles). In some embodiments, $R_2$ may be between 0 mm and 2 mm (i.e., no greater than 2 mm). In some embodiments, $R_2$ may be between 0 mm and 1 mm. In some embodiments, $R_2$ may be 1 mm+/− 0.2 mm. A radius of curvature ($R_2$) for edge corners 146 that is equal to or deviates only slightly from the radius of curvature ($R_1$) for edge corners 136 minimizes gaps between edge corners 136 and 146 and/or gaps between side wall surface 145 and cavity side surface 134 when base box 120 and packaging insert are assembled.

Figure 8:
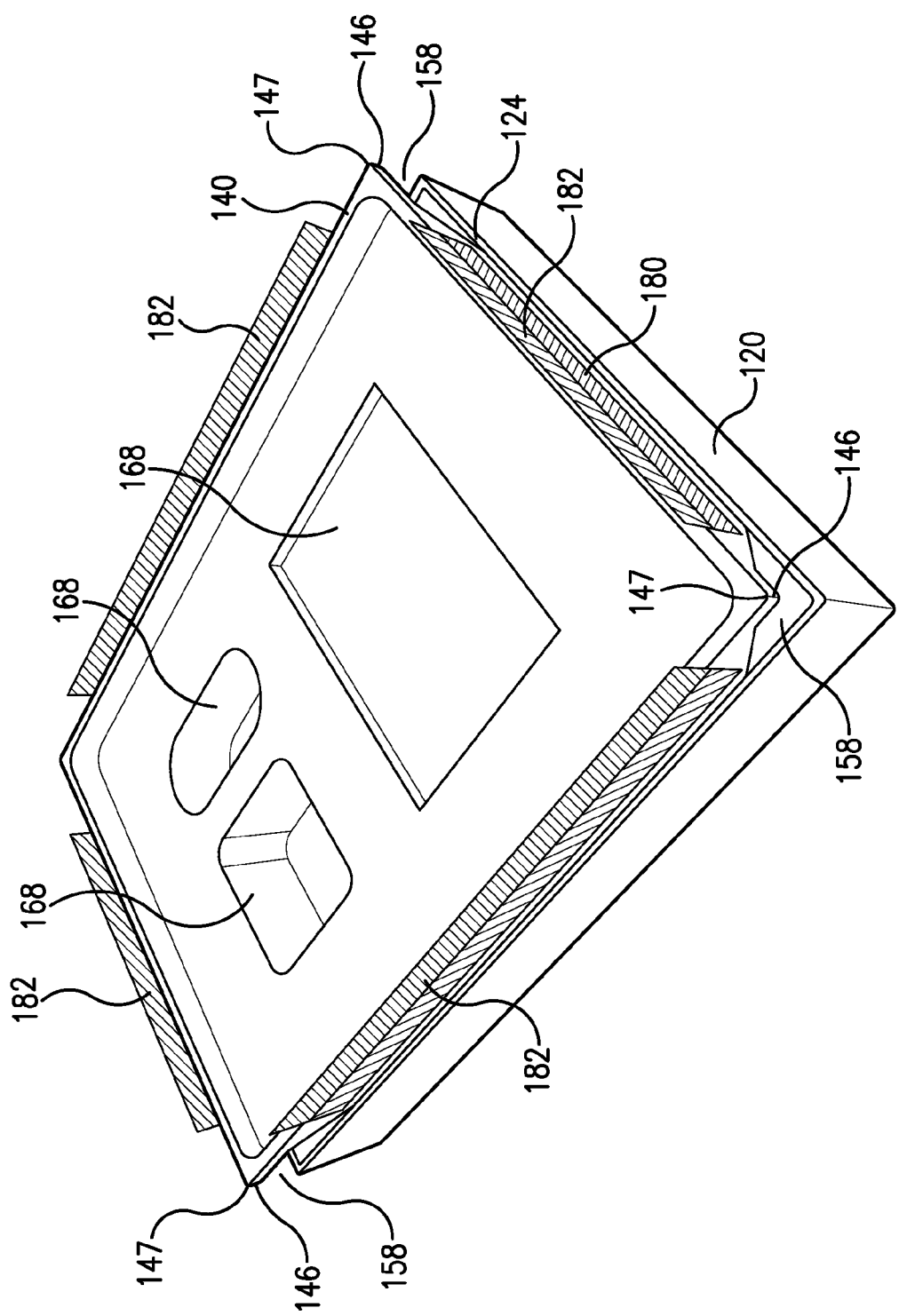
FIG. 8 shows a partially assembled perspective view of packaging according to an embodiment.
Figure 9:
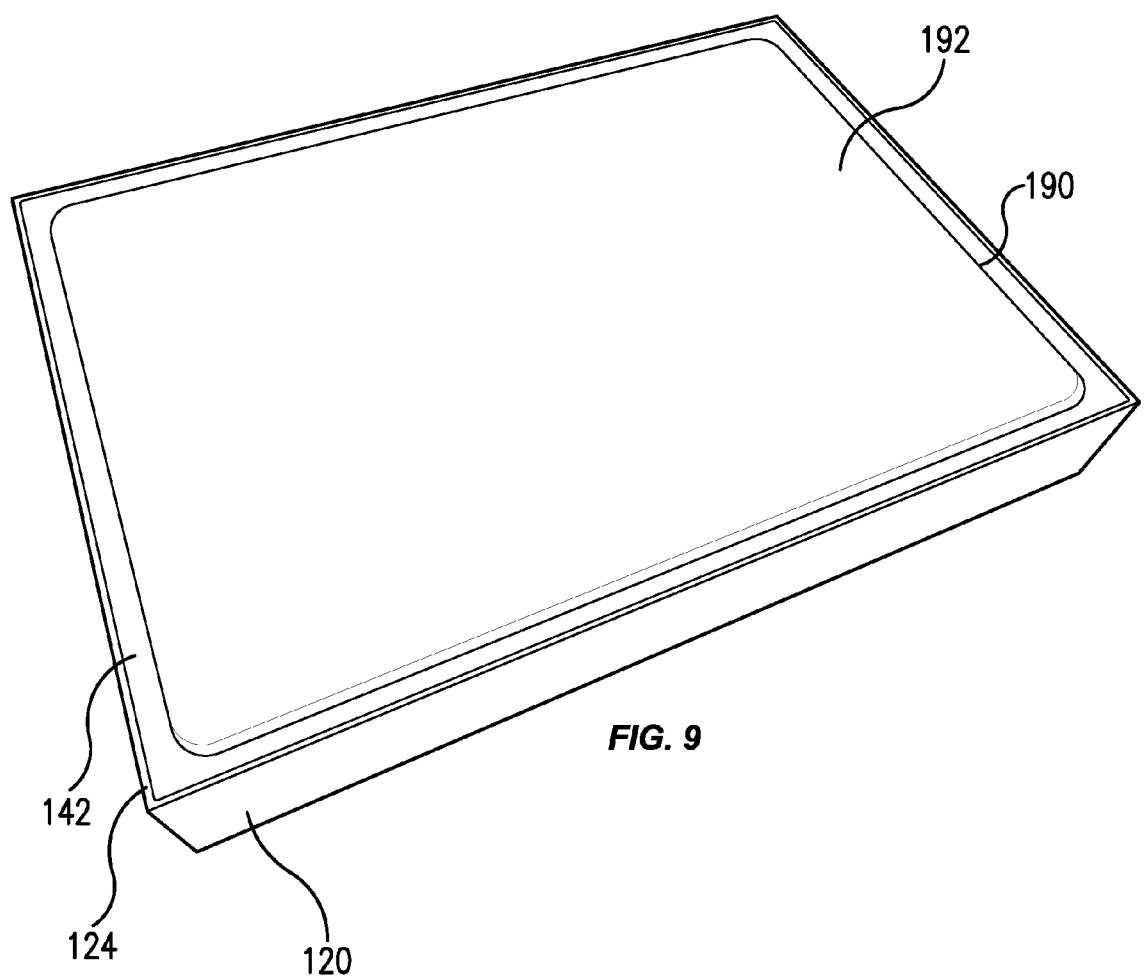
FIG. 9 shows an assembled perspective view of packaging and a product according to an embodiment.
Figure 10:
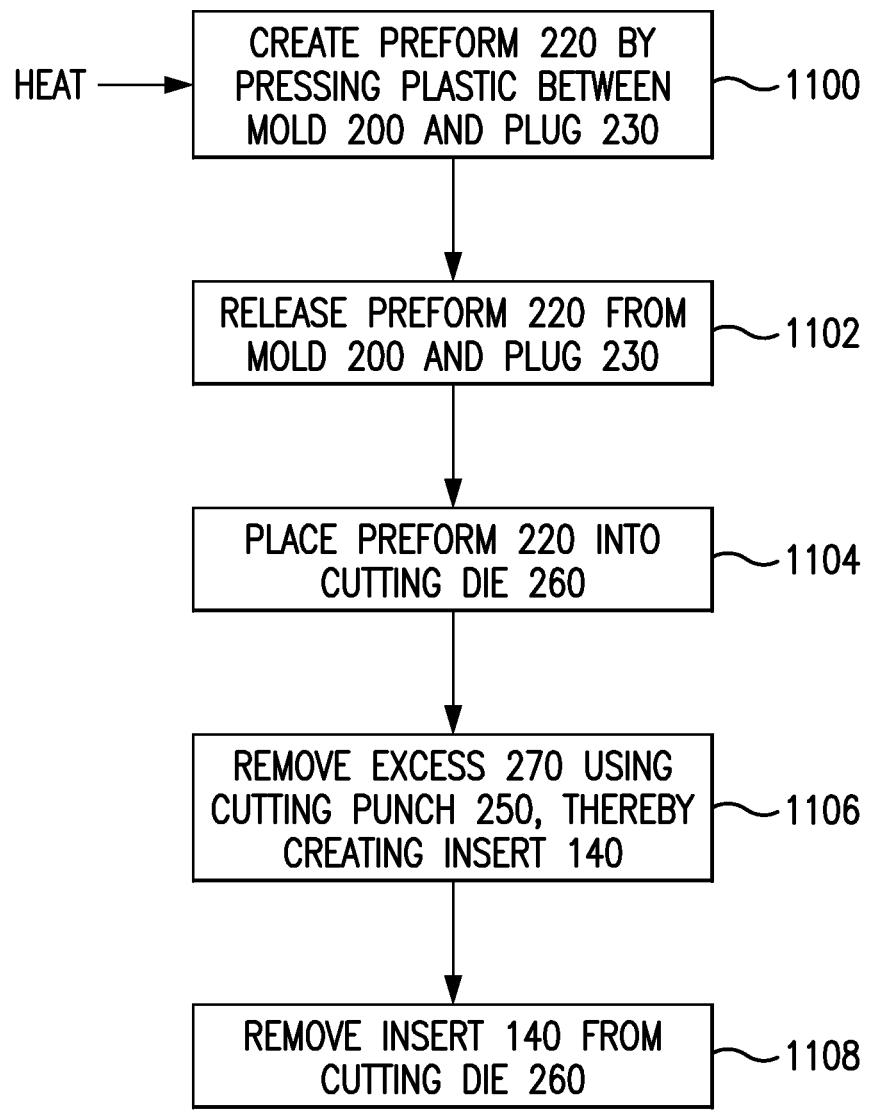
FIG. 10 shows a flowchart for a method of making packaging according to an embodiment.

FIGS. 8 and 9 show the assembly of packaging 100 according to an embodiment. In some embodiments, the length and width of top wall 142 may equal the length and width of cavity 130. A top wall 142 having a length and width equal to the length and width of cavity 130 combined with edge corners 136 and 146 having substantially the same shape results in packaging insert 140 having an exterior profile that substantially matches an interior profile of base box 120.

As shown in FIGS. 8 and 9, adhesive 180 may be applied to side wall surface 145 before packaging insert 140 is placed into base box 120. In some embodiments, adhesive 180 may be tape having a release liner 182. In such embodiments, release liner 182 may extend above top wall 142 such that it can be removed after packaging insert 140 is placed into base box 120. FIG. 9 shows packaging insert 140 received in base box 120 with product 190 placed in cavity 162. In some embodiments, top surface 192 of product 190, top wall 142, and edge 124 of base box 120 may be flush when the packaging is assembled as shown, for example, in FIG. 9. After product 190 is properly positioned within cavity 162, lid 110 may be placed over base box 120, thereby enclosing product 190 within packaging 100.

In some embodiments, packaging insert 140 may be a single integrally formed piece. In some embodiments, packaging insert 140 may be formed using a thermo-forming process. In some embodiments, the thermo-forming process may employ a mold 200 and a plug 230 to pull or draw a sheet of plastic into a desired shape. An exemplary process of forming packaging insert 140 will now be described in reference to FIGS. 10-13. In some embodiments, the thermo-forming process for making packaging insert 140 may include the below-described operations.

A preform 220 may be created by pressing a plastic sheet between mold 200 and plug 230 (1100). In some embodiments, mold 200 and plug 230 may draw the plastic sheet into a desired shape while applying heat. In some embodiments, the plastic sheet may be drawn at a temperature between 260° F. and 360° F.

Figure 11:
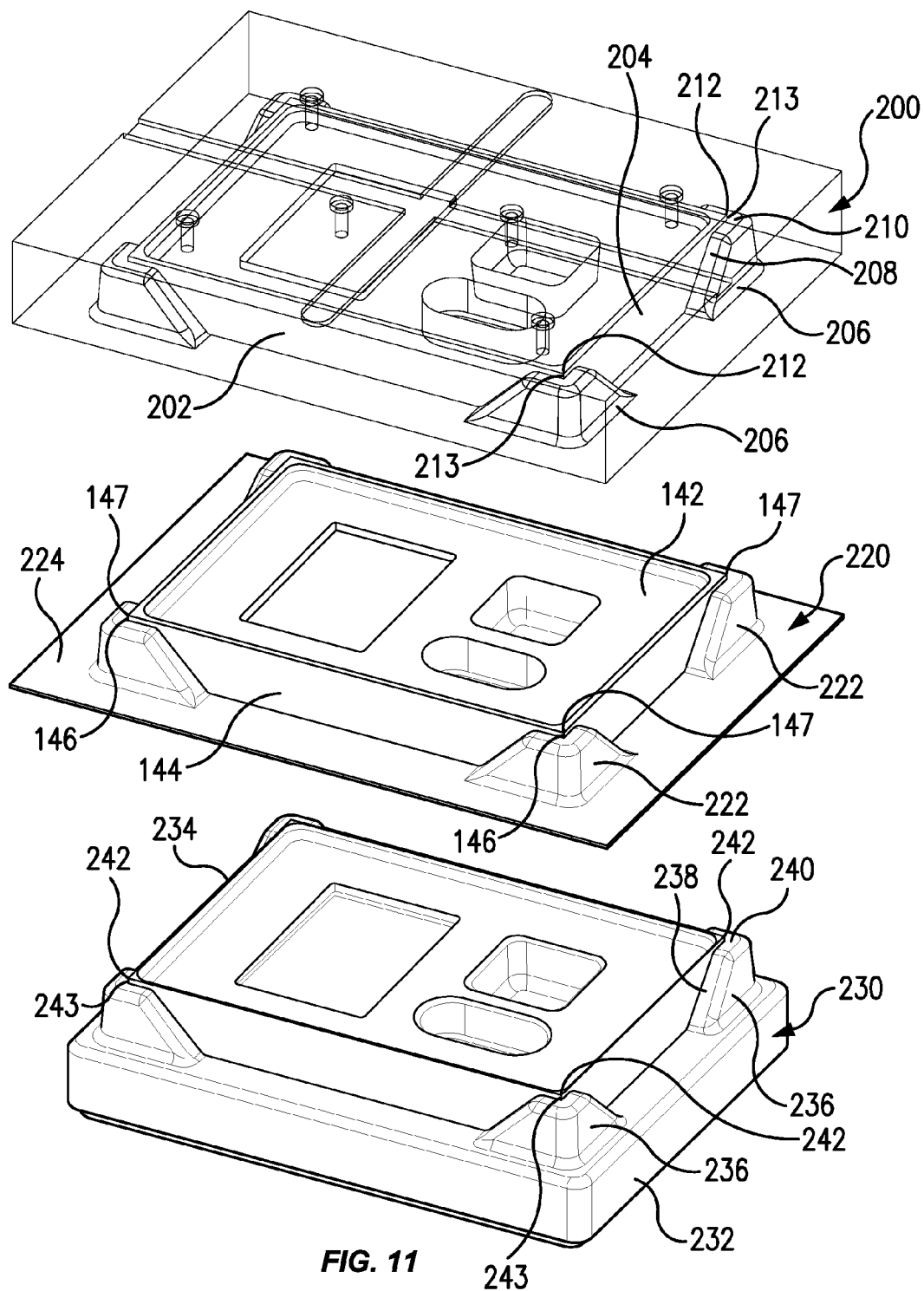
FIG. 11 shows a mold for making a packaging insert according to an embodiment.

As shown in FIG. 11, mold 200 may include a cavity 202 having a cavity wall 204 with a plurality of vertex corners 212 and a plurality of edge corners 213 extending from vertex corners 212. Cavity wall 204 may include corner alcoves 206 having an interior flange 208 and a corner wall 210. Also shown in FIG. 11 is plug 230. Plug 230 may have a base 232 and a body 234. Body 234 may have a size and shape that corresponds to cavity 202 in mold 200. Body 234 may include a plurality of vertex corners 242 and a plurality of edge corners 243 extending from vertex corners 242 corresponding to corners 212 and 213 of cavity wall 204, respectively. Edge corners 243 and 213 form edge corners 146 on packaging insert 140 and may have the same radius of curvature ($R_2$) as edge corners 146. Body 234 may include corner protrusions 236 corresponding to corner alcoves 206. Corner protrusions 236 may have an exterior flange 238 corresponding to interior flange 208 and a top wall 240 corresponding to corner wall 210.

The size, shape, and location of corner alcoves 206 and corner protrusions 236 create abbreviated portions 150 and transition portions 154 on side wall 144. Corner wall 210 and top wall 240 inhibit the formation of stress marks on or near corners 146 and 147 because the vertical draw (i.e., in a direction 10) of plastic sheet is relatively small at corners 146 and 147. In other words, corner wall 210 and top wall 240 result in a vertical draw in direction 10 around corners 146 and 147 that is less than the vertical draw for the rest of side wall 144. As the plastic sheet is pressed between mold 200 and plug 230, plastic being drawn around vertex corners 242 and edge corners 243 of plug 230 is only drawn a short vertical distance because once the plastic hits top wall 240 the draw becomes horizontal. The horizontal draw (or lack of continued vertical draw) at top wall 240 may relieve some of the stresses in the plastic at or near vertex corners 242. The rest of the vertical draw for the plastic located at or near corners 242 and 243 occurs on corner protrusions 236. As such, the stresses associated with the remaining vertical draw may be concentrated around corner protrusions 236 rather than vertex corners 242. Since corner protrusions 236 are later cut off (see 1106), defects in the plastic at these locations will also be cut off. The vertical distance between top wall 240 and vertex corners 242 (i.e. the length of edge corners 243) may be equal to the height ($h_1$) of abbreviated portions 150 on packaging insert 140.

In some embodiments, top wall 240 may only be used near corners 242 and 243 because the stresses associated with drawing plastic around these corners, specifically vertex corners 242 decreases the further away a section of plastic is from a corner. As such, the vertical draw may be allowed to increase when moving away from corners 242 and 243. The slope of exterior flange 238 forms transition portions 154 and results in an increased vertical draw moving away from corners 242 and 243 in order to form transition portions 154 and extended portions 148. Transition portions 154 may help prevent the formation of stress marks because they avoid an abrupt change in the height of side wall 144. Moreover, transition portions 154 may facilitate an easy release of preform 220 from mold 200 and plug 230.

Preform 220 may be released from mold 200 and plug 230 (1102). As shown in FIG. 11, preform 220 includes top wall 142 and side wall 144 having extended portions 148 and abbreviated portions 150. At this stage preform also includes excess 270. Excess 270 includes corner extensions 222, formed by corner alcoves 206 and corner protrusions 236, and a skirt 224.

Figure 12:
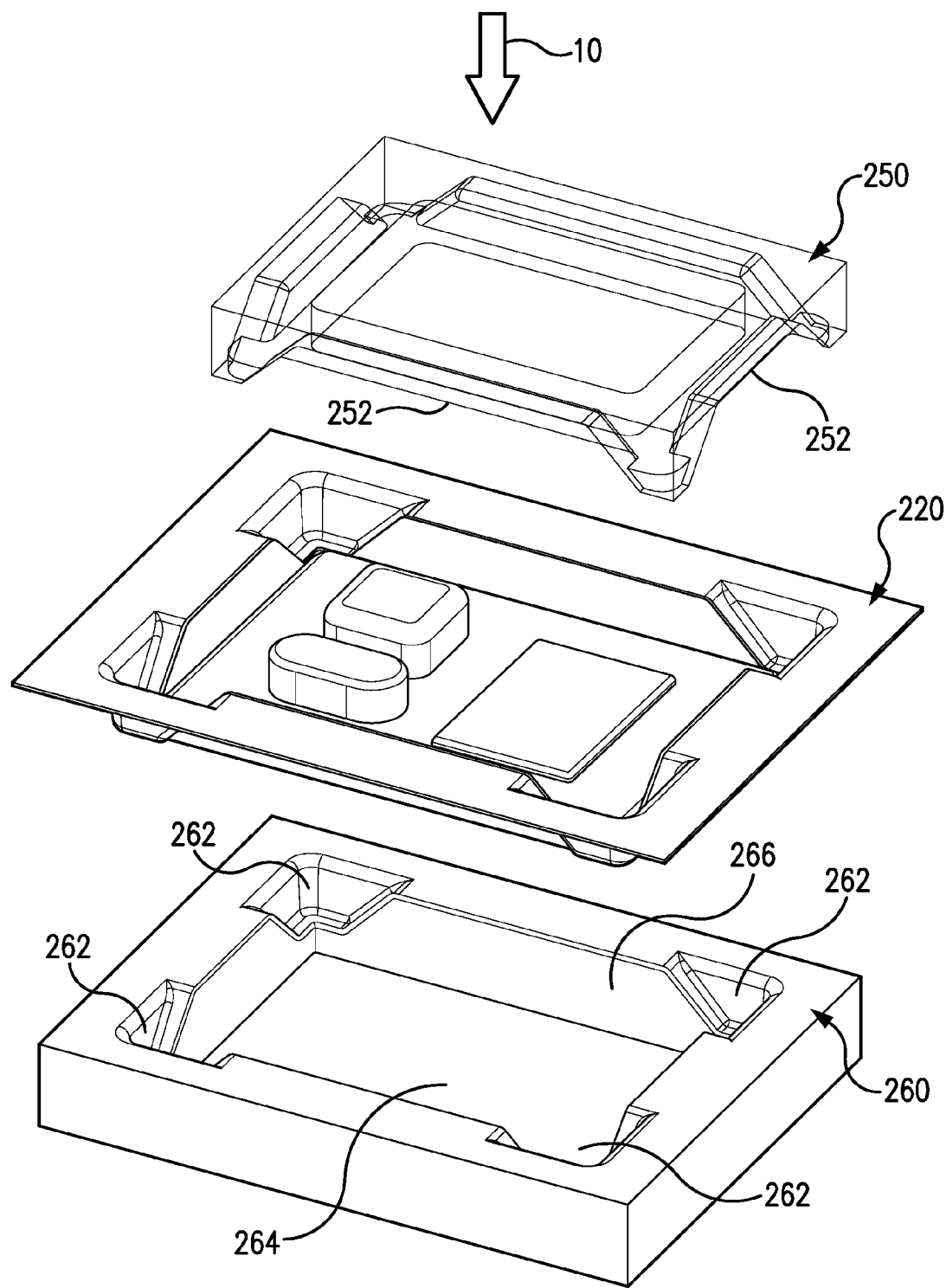
FIG. 12 shows a cutting tool for cutting a packaging insert according to an embodiment.
Figure 13:
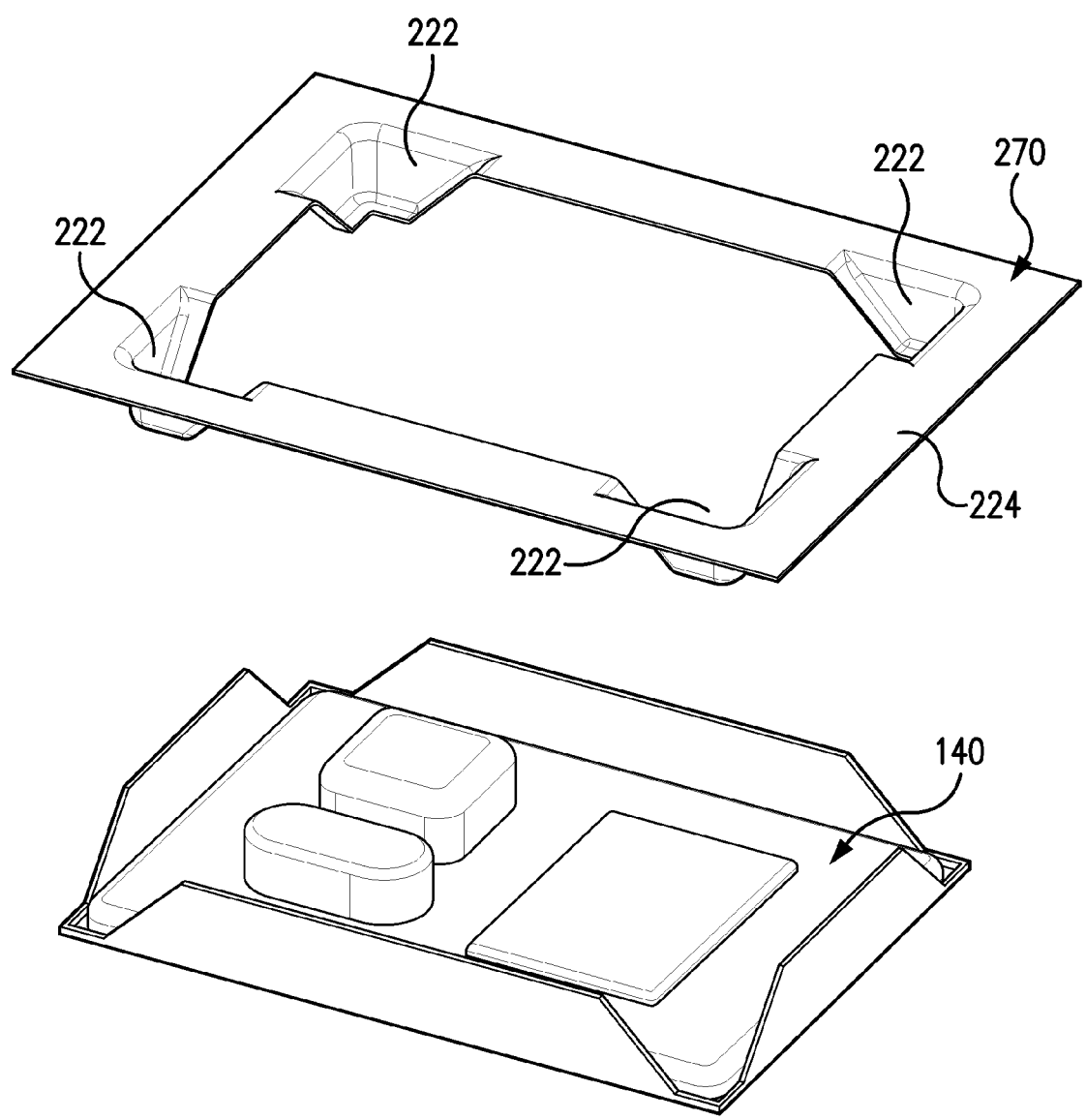
FIG. 13 shows the excess cut from a packaging insert according to an embodiment.

Preform 220 may be placed into cutting die 260 (1104). As shown in FIG. 12, cutting die 260 may include cavities 262 to receive corner extensions 222 on preform 220. Cutting die 260 may also include a hollow center 264 defined by a center wall 266. Hollow center 264 may be configured to receive top wall 142 and side wall 144 of packaging insert 140. In some embodiments, the length and width of hollow center 264 are equal to the length and width of top wall 142.

Excess 270 may be removed from preform 220 using a cutting punch 250, thereby forming packaging insert 140 (1106). Cutting punch 250 may cut off excess 270 while preform 220 is in cutting die 260. Cutting punch 250 may include a cutting edge 252 for cutting preform 220. In some embodiments, cutting punch 250 may be forced through hollow center 264 of cutting die 260 in order to cut off excess 270. In some embodiments, the dimensions of cutting die 260 and cutting punch 250 may be such that they leave lip 156 on side wall edge 152 of packaging insert 140. While cutting punch 250 and cutting die 260 are shown in FIG. 12, other methods of removing excess 270 may be used. Suitable methods include, for example, machining or cutting by hand.

Packaging insert 140 may be removed from cutting die 260 (1108). In some embodiments, side wall edge 152 may be sanded to remove sharp edges and create an even lip 156 all the way around side wall edge 152. In some embodiments, lip 156 may be removed using sanding.

In some embodiments, packaging insert 140 may be made from polystyrene. The plastic used to make packaging insert 140 may have any color. In some embodiments, packaging insert 140 may be white. In some embodiments, packaging insert 140 may have a dark color, such as black, blue, or red. The design of the mold 200, plug 230, and the shape and dimensions of the resulting packaging insert 140 help prevent the formation of defects such as stress marks, especially at corners 146 and/or 147. Packaging inserts having edge corners 146 and/or vertex corners 147 with a radius of curvature ($R_2$) that is very small (i.e., approaching zero) are particularly susceptible to such defects, which are minimized or eliminated using the inventive techniques described herein.

In some embodiments, thickness of the walls (e.g., top wall 142 and side wall 144) of packaging insert 140 may be between 1 mm and 2 mm (e.g., between 1.50 mm and 1.70 mm). In some embodiments, the thickness of the walls may be 1.60 mm+/−0.5 mm. In some embodiments, the draft angle for surfaces of packaging insert 140 (e.g., cavity side surface 134, side wall surface 145, and side walls of recesses 168) may have a draft angle of greater than or equal to 1° to facilitate release of preform 220 from mold 200 and plug 230.

Figure 14:
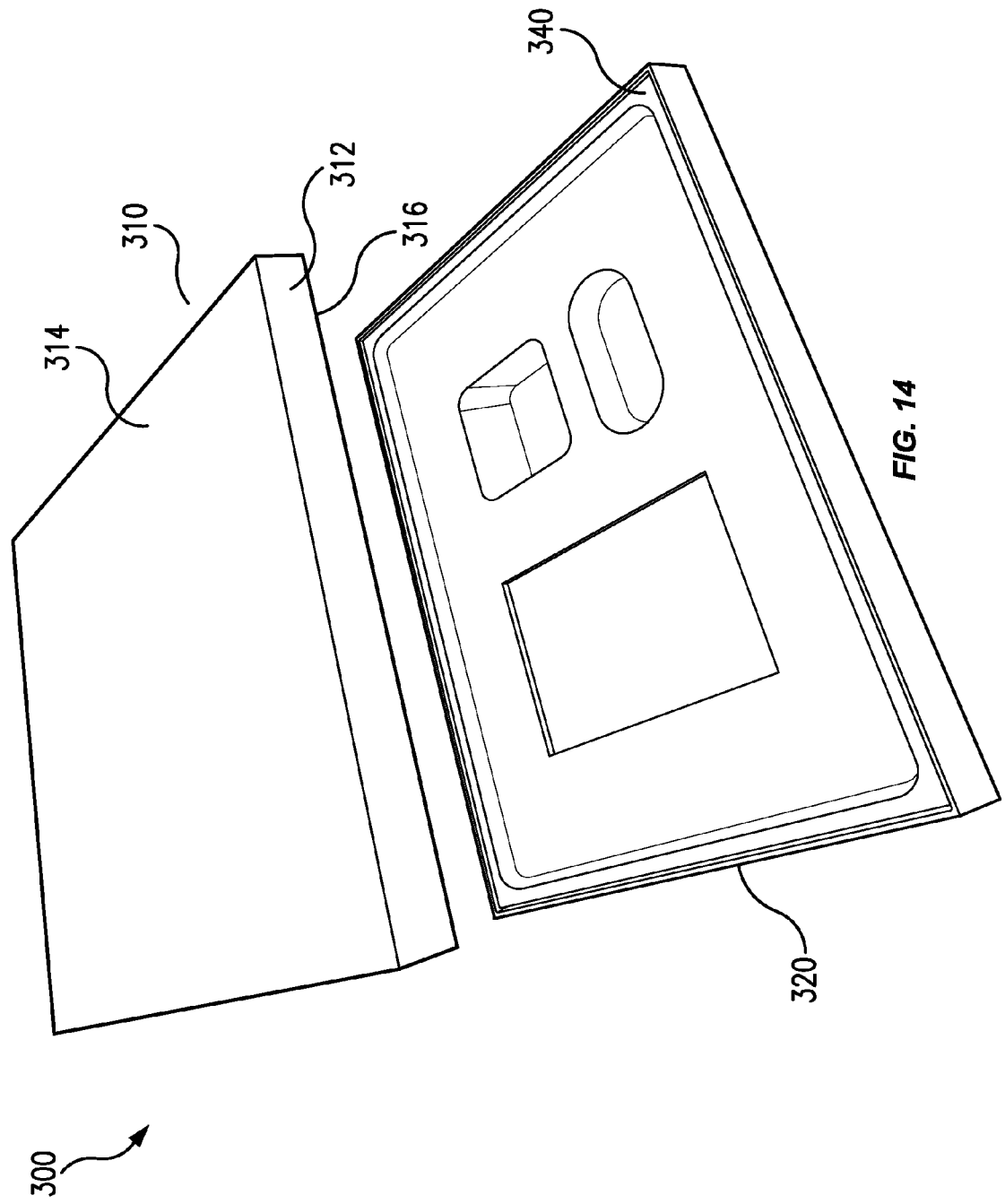
FIG. 14 shows a perspective view of packaging according to an embodiment.

Some embodiments of the present invention include packaging 300 for protecting and displaying consumer products. As shown in FIG. 14, packaging 300 may include a lid 310, a base box 320, and a packaging insert 340. Lid 310 may include a side wall 312, a top wall 314, and a lid edge 316. When assembled in a closed configuration, lid 310 may be placed over base box 320 and may receive at least a portion of base box 320. In some embodiments, lid 310 may receive the entire base box 320.

Figure 15:
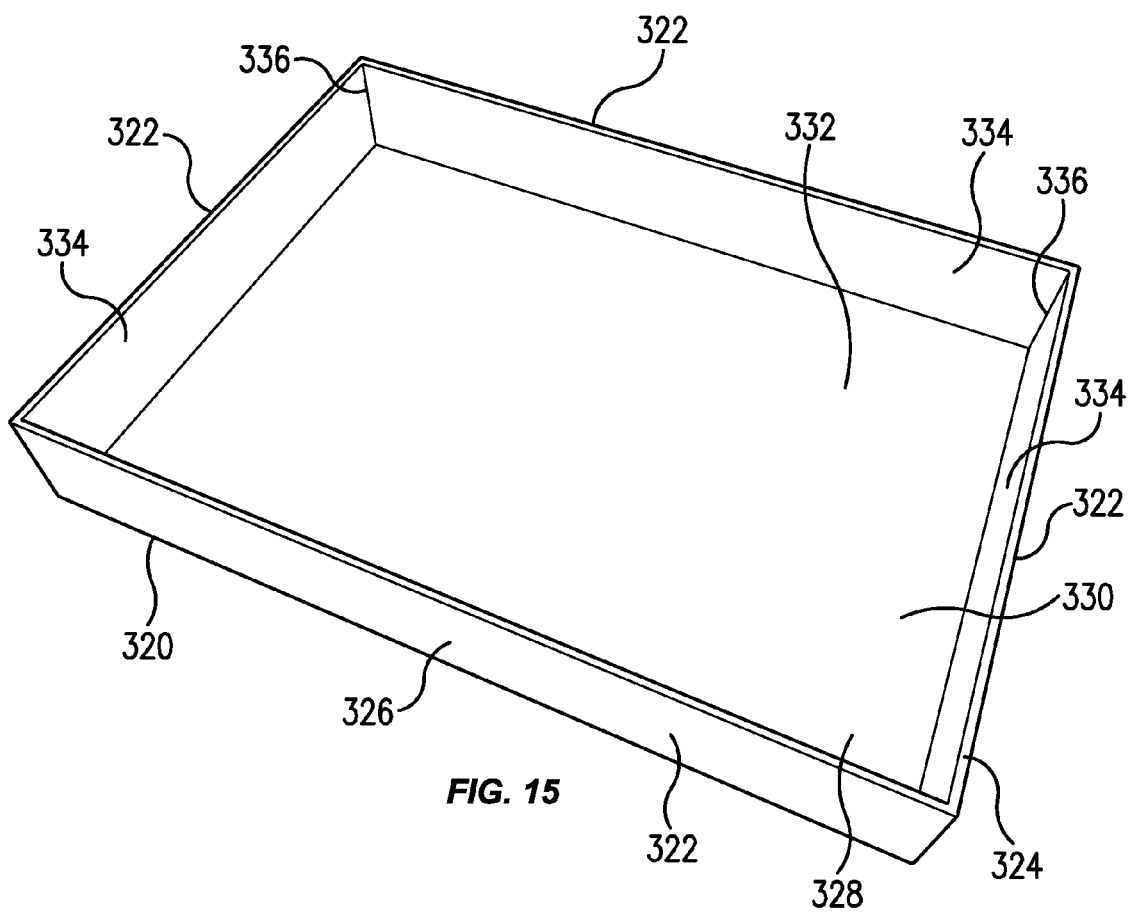
FIG. 15 shows a perspective view of a base box according to an embodiment.

As shown in FIG. 15, base box 320 may include a cavity 330 defined by a horizontal wall 328 and a vertical wall 322, vertical wall 322 extending from horizontal wall 328 to an edge 324. Cavity 330 may be configured to receive at least a portion of packaging insert 340. Cavity 330 includes a cavity bottom surface 332 and a cavity side surface 334. Vertical wall 322 includes an exterior side surface 326. When lid 310 is placed over base box 320, at least a portion of exterior side surface 326 may contact an interior side surface of lid 310. In some embodiments, the height of lid 310 may be such that lid edge 316 aligns with the underside of horizontal wall 328 of base box 320 (i.e., the surface of horizontal wall 328 opposite cavity bottom surface 332) when lid 310 is fully seated over base box 320.

Vertical wall 322 of base box 320 may define a plurality of edge corners 336. In some embodiments, vertical wall 322 may define four edge corners 336 formed at right angles (i.e., 90° angles). In some embodiments, edge corners 336 have a radius of curvature that is the same or similar to the radius of curvature of edge corners 136 described in reference to FIGS. 2 and 7. In some embodiments, base box 320 may be made of cardboard. In some embodiments, base box 320 may be made of plastic. Suitable plastics include, for example, polyethylene, polypropylene, polyurethane, polystyrene, etc.

Figure 16:
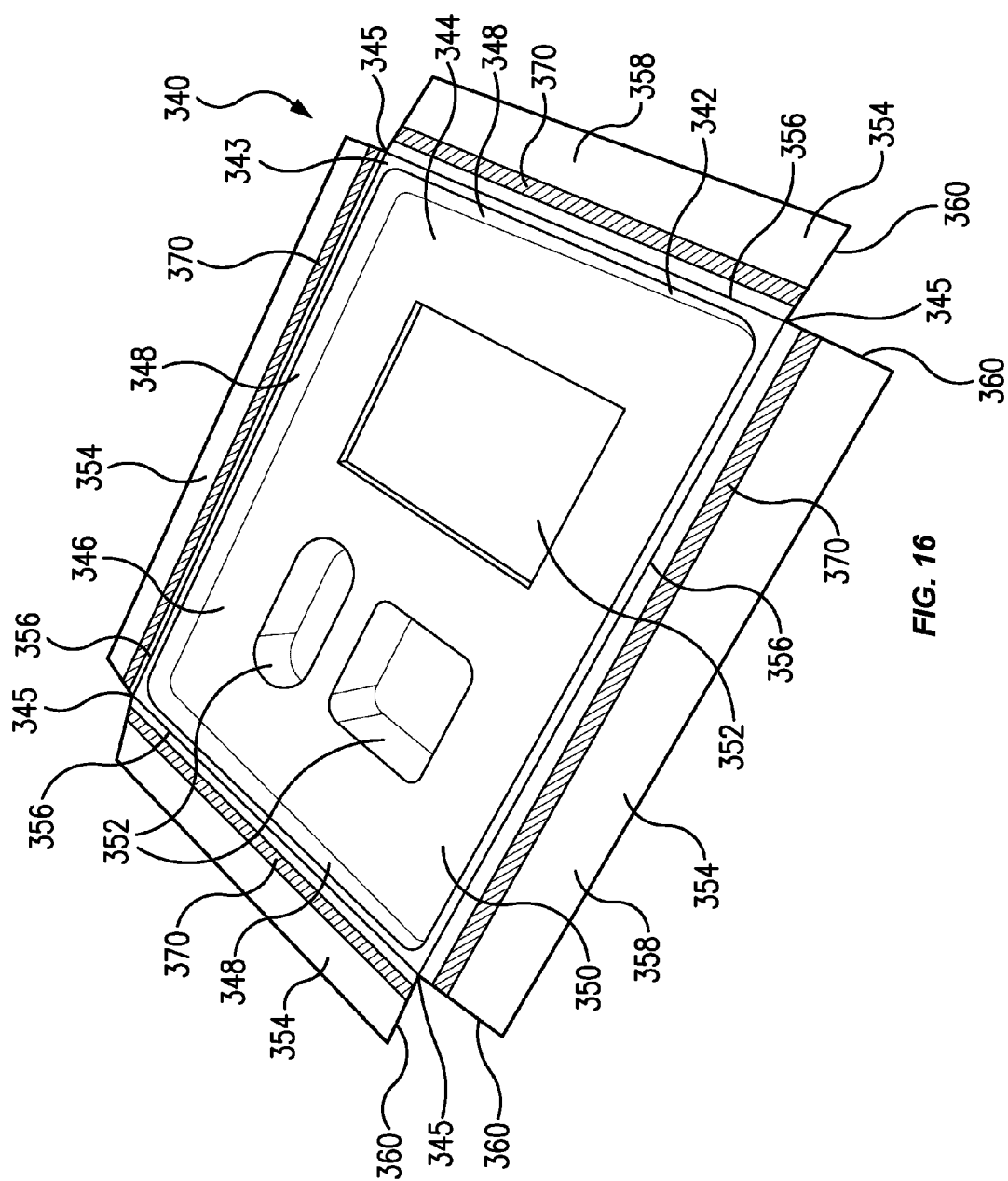
FIG. 16 shows a perspective view of a packaging insert according to an embodiment.

FIGS. 16-19 show a packaging insert 340 according to an embodiment. As shown in FIG. 16, packaging insert 340 may include a body 342 having a top surface 344 and a perimeter 343. One or more flaps 354 may be coupled to perimeter 343 of body 342. In some embodiments, flaps 354 may be coupled to body via one or more hinges 356. In some embodiments, hinges 356 may be cuts or scores that remove material along top surface 344 and/or on a bottom surface 364 of body 342 (e.g., V-cuts). Flaps 354 may include a first surface 358, a second surface 362, and a side edge 360. In some embodiments, each side of top surface 344 along perimeter 343 may include a flap 354. Flaps 354 and top surface 344 may define a plurality of corners 345, which become vertex corners 345 when flaps 354 are folded into a second position.

In some embodiments, each flap 354 is configured to rotate about a hinge 356 between at least a first position and a second position. In the first position, flaps 354 may be oriented parallel to top surface 344 of body 342 (see FIG. 19). In the second position, flaps 354 may be oriented perpendicular to top surface 344 of body 342 (see FIG. 21). In some embodiments, packaging insert 340 may include four hinges 356 and four flaps 354.

Top surface 344 of body 342 may be interrupted by a cavity 346 formed therein. Cavity 346 may receive at least a portion of a product 380. Cavity 346 may include a cavity bottom surface 350 and a cavity side surface 348. In some embodiments, cavity 346 is shaped such that it conforms to the exterior shape of product 380. In some embodiments, cavity 346 is shaped such that the bottom of product 380 rests on cavity bottom surface 350 and a top surface 382 of product 380 sits flush with perimeter 343 of top surface 344. The particular size and shape of cavity 346 shown in the figures is exemplary—it may be modified to correspond to at least some portion of the exterior shape of a product intended to be packaged. As shown in FIG. 16, cavity 346 may include at least one recess 352 for housing accessories, such as, for example, a power cord, a USB cord, or an instruction manual.

Figure 17:
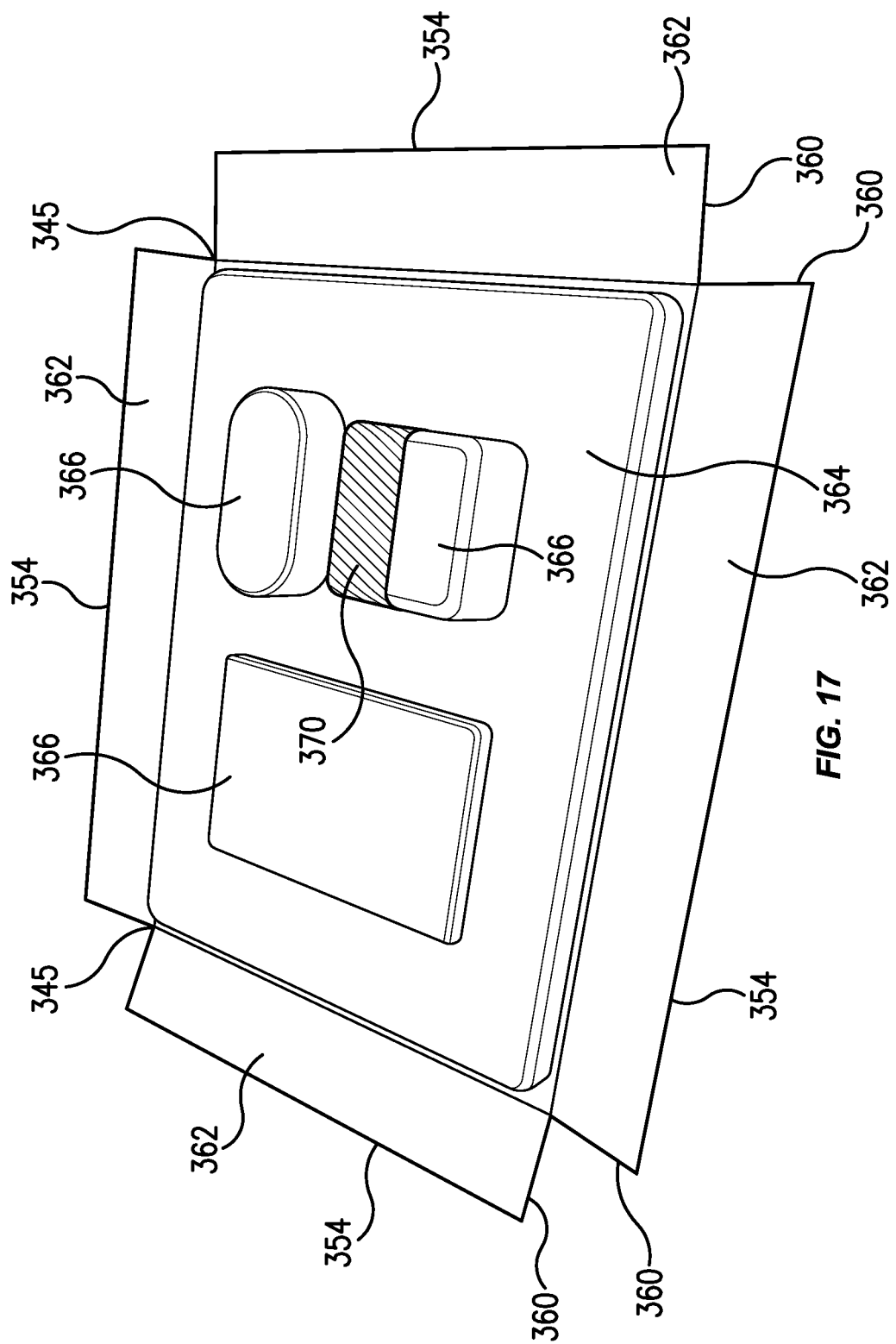
FIG. 17 shows a perspective view of a packaging insert according to an embodiment.
Figure 18:
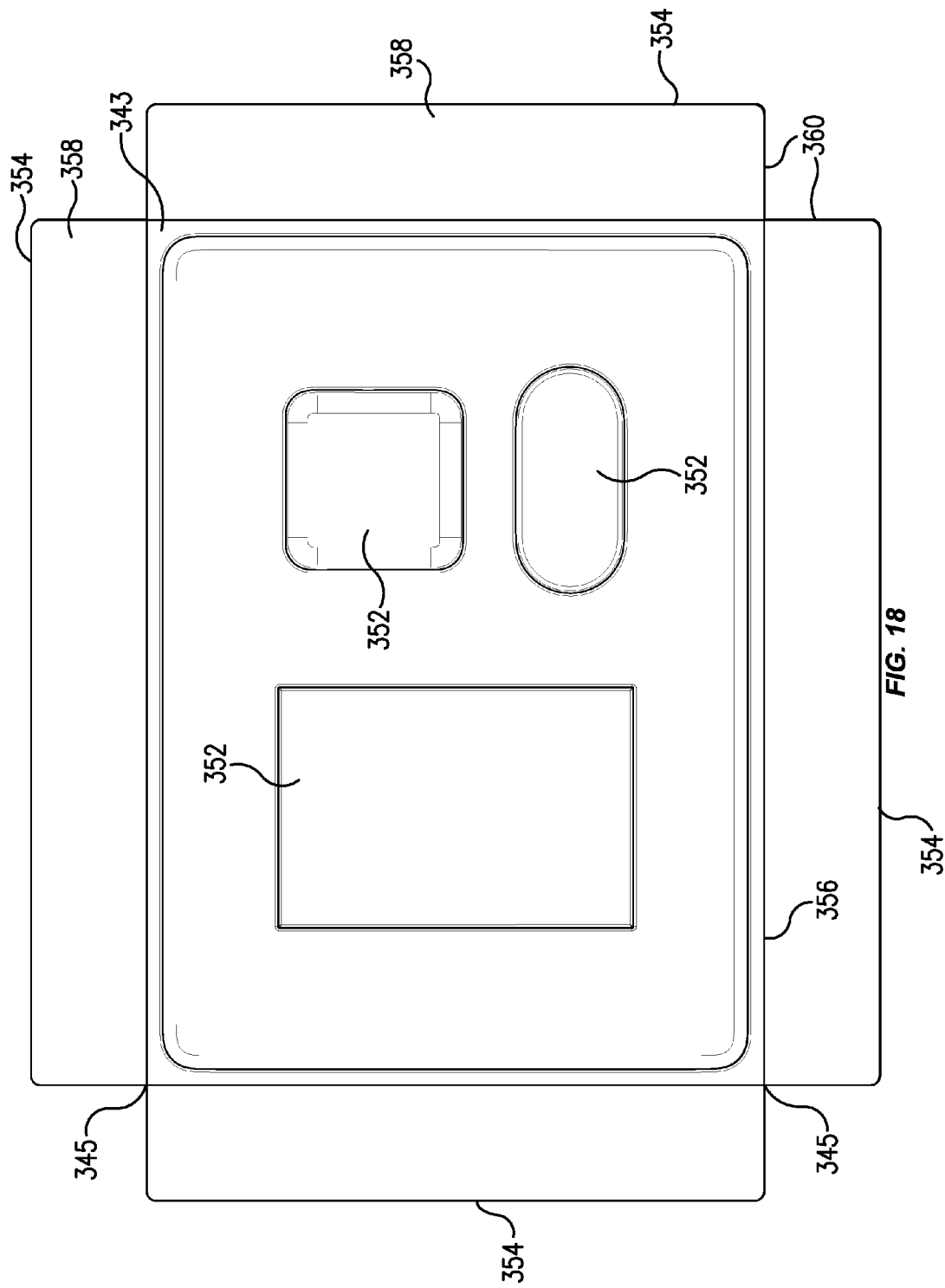
FIG. 18 shows a top view of a packaging insert according to an embodiment.
Figure 19:
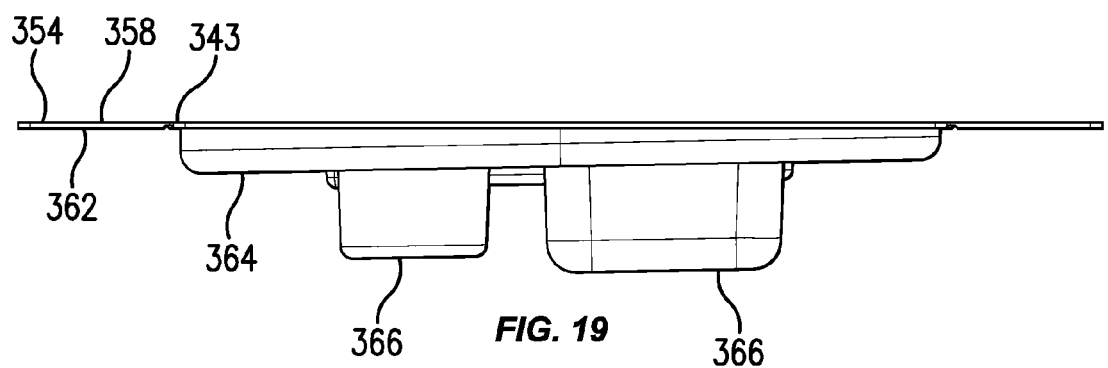
FIG. 19 shows a side view of a packaging insert according to an embodiment.
Figure 20:
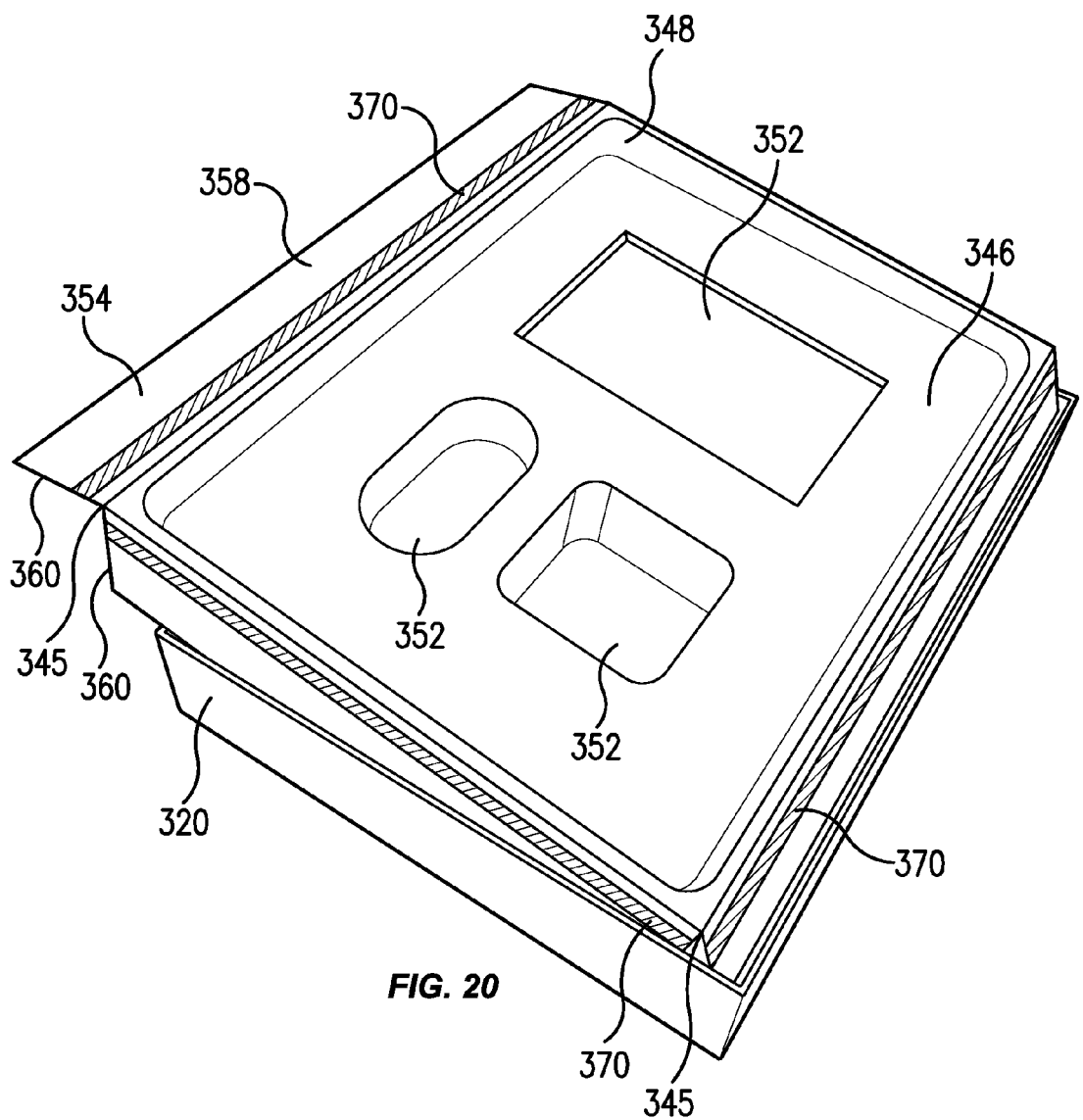
FIG. 20 shows a partially assembled perspective view of packaging according to an embodiment.

As shown in FIG. 17, the underside of packaging insert 340 may include bottom surface 364. Bottom surface 364 may have projections 366 corresponding to recesses 352 in cavity 346. In some embodiments, at least one of the projections 366 may have a height equal to the height of cavity side surface 334 of base box 320 such that at least one of the projections 366 contacts cavity bottom surface 332 of base box 320 when packaging insert 340 and base box 320 are assembled. In some embodiments, adhesive 370 may be applied to the bottom of the at least one projection 366 having a height equal to cavity side surface 334, thereby creating an adhesive bond between cavity bottom surface 332 and packaging insert 340 when assembled. Adhesive 370 may include, for example, glue or tape (with or without a release liner).

Figure 21:
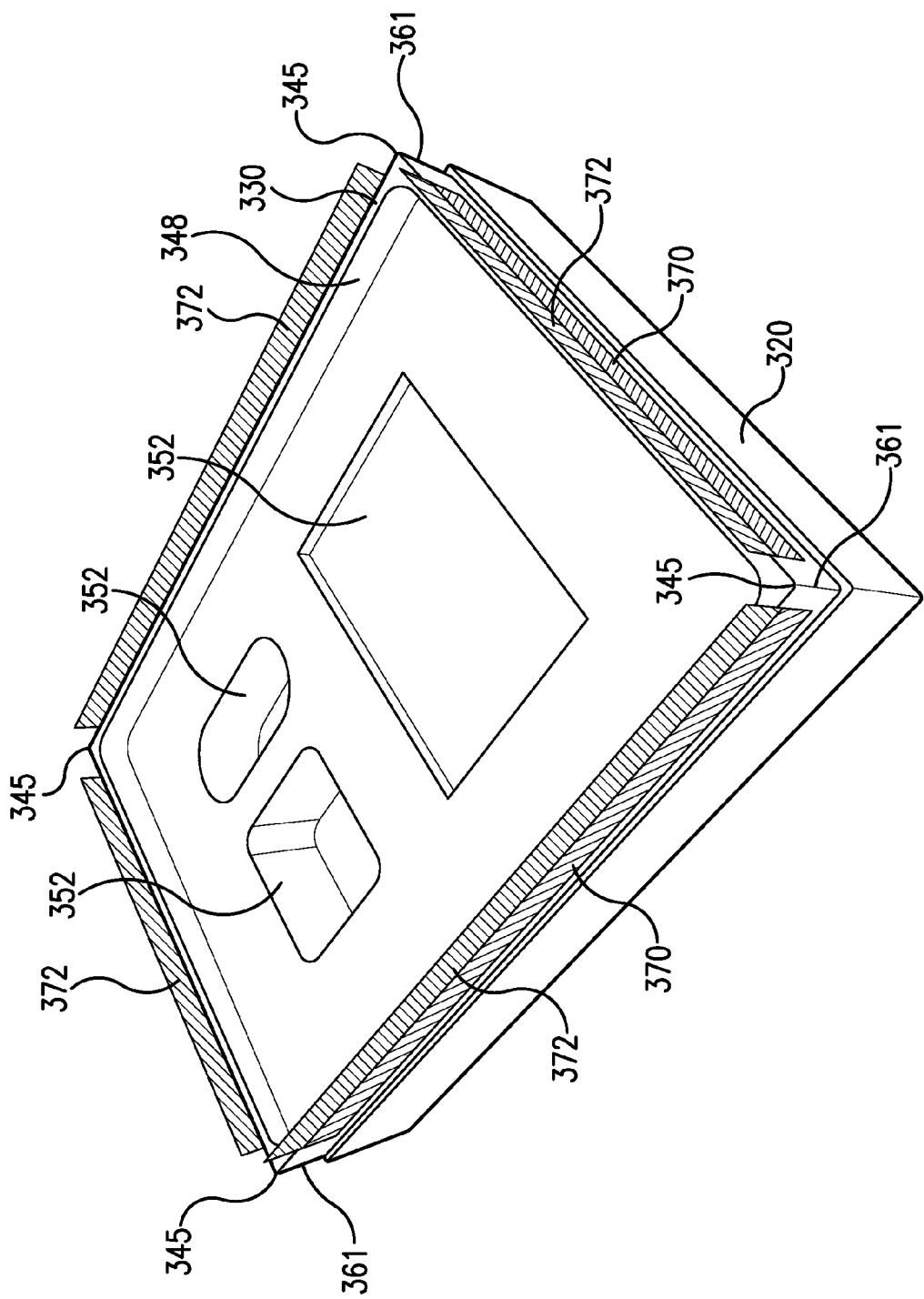
FIG. 21 shows a partially assembled perspective view of packaging according to an embodiment.

The functionality of packaging insert 340 and the assembly of packaging 300 according to an embodiment will now be described in reference to FIGS. 16-17 and 20-22. As shown in FIGS. 16 and 17, adhesive 370 may be applied to first surface 358 on each flap 354 and to bottom surface 364 at the location of at least one projection 366. Once adhesive is properly applied, each flap 354 may be folded into the second position perpendicular to perimeter 343 and packaging insert 340 may be placed into base box 320 (see FIGS. 20 and 21). As shown in FIG. 21, when flaps 354 are folded into the second position, side edges 360 of adjacent flaps 354 contact each other, thereby forming vertex corner 345 and a quasi-continuous edge corner 361 extending form vertex corner 345. In some embodiments, the length and width of perimeter 343 of body 342 may equal the length and width of cavity 330 in base box 320.

Once each flap 354 is folded into the second position and side edges 360 of adjacent flaps 354 contact each other, top surface 344 of packaging insert 340 may have the same or substantially the same dimensions relative to base box 320 as top wall 142 of packaging insert 140 does relative to base box 120, described above. Additionally, once each flap 354 is folded into the second position and side edges 360 of adjacent flaps 354 contact each other, quasi-continuous edge corners 361 and vertex corners 345 of packaging insert 340 may have the same or substantially the same radius of curvature as edge corners 146 and vertex corners 147 of packaging insert 140, respectively, as described above in reference to FIG. 7. Additionally or alternatively, quasi-continuous edge corners 361 of packaging insert 340 may have the same or substantially the same radius of curvature relative to edge corners 336 of base box 320 as do edge corners 146 of packaging insert 140 relative to edge corners 136 of base box 120 (see FIG. 7). For example, quasi-continuous edge corners 361 and edge corners 336 may each have a radius of curvature of zero.

In some embodiments, edge corners 336 of base box 320 may have substantially the same shape and size as quasi-continuous edge corners 361 of packaging insert 340, thereby facilitating close proximity between corners 336 and 361. Such close proximity, approximating and including contact between corners 336 and corners 361, minimizes gaps between packaging insert 340 and base box 320. Minimizing gaps between packaging insert 340 and base box 320 may make packaging insert 340 and base box 320 look more like a single, solid piece. Such a configuration may increase the aesthetic appeal of packaging 300 and focus a consumer's attention on product 380 rather than aspects of packaging 300. Corners 336 and 361 that have radii of curvature that are substantially equal or only minimally different results in the smallest gaps between corners 336 and 361, and are achievable using the inventive structure and techniques described herein. In some embodiments, the gap between an edge corner 336 and an edge corner 361 may be no greater than 0.75 mm. In some embodiments, the gap between an edge corner 336 and an edge corner 361 may be 0.25 mm.

Figure 22:
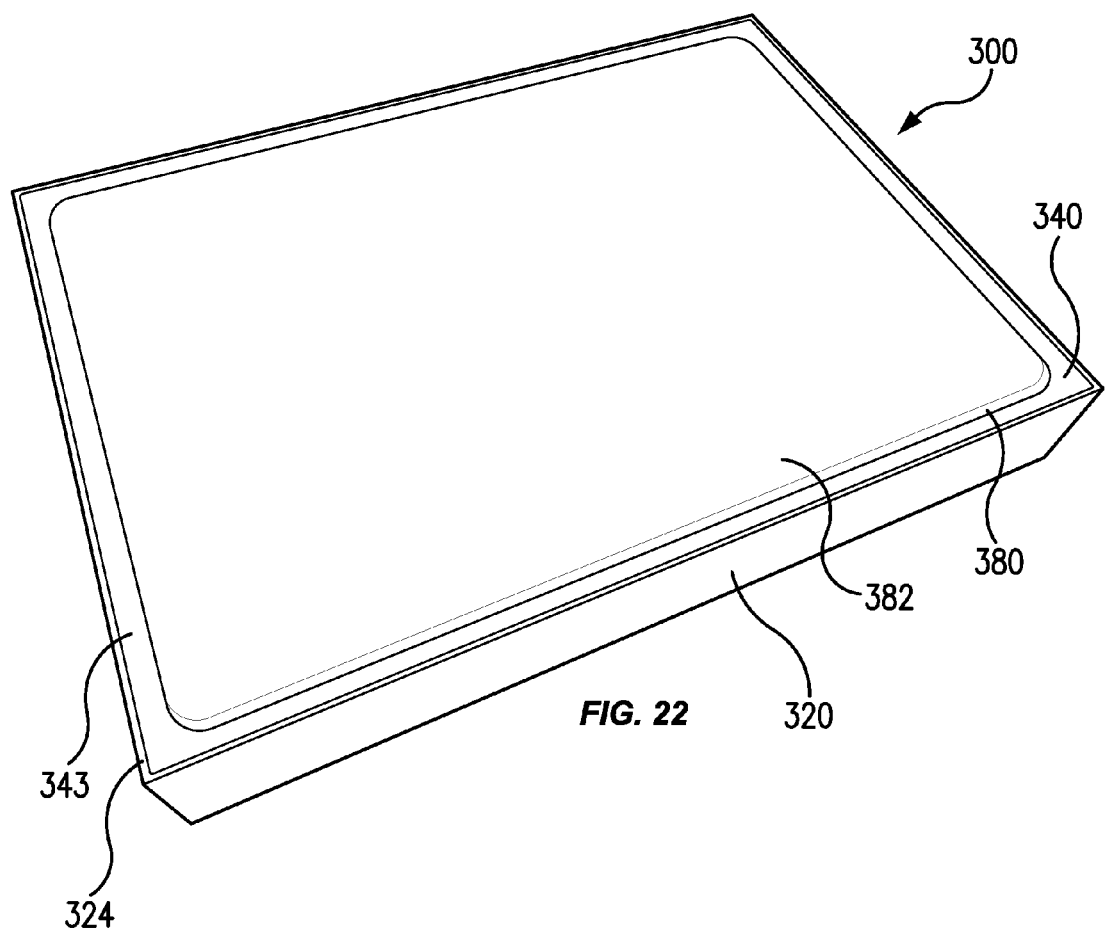
FIG. 22 shows an assembled perspective view of packaging and a product according to an embodiment.

Once each flap 354 is folded into the second position and side edges 360 of adjacent flaps 354 contact each other, packaging insert 340 may be pressed into base box 320 as shown in FIG. 22. In some embodiments, adhesive 370 may be tape having a release liner 372. In such embodiments, release liner 372 may extend above body 342 such that it can be removed after packaging insert 340 is placed into base box 320. In some embodiments, the top surface 382 of product 380, perimeter 343 of top surface 344, and edge 324 of base box 320 may be flush when packaging 300 is assembled as shown in FIG. 22. When packaging insert 340 is placed into base box 320 with flaps 354 in the second position, flaps 354 may rest on cavity bottom surface 332, thereby supporting cavity 346 spaced above cavity bottom surface 332. In some embodiments, the height of folded flaps 354 may be equal to the height of cavity side surface 334 of base box 320 such that perimeter of top surface 344 is flush with edge 324 when packaging insert 340 and base box 320 are assembled. After product 380 is properly positioned within cavity 346, lid 310 may be placed over base box 320, thereby enclosing product 380 within packaging 300.

Figure 23:
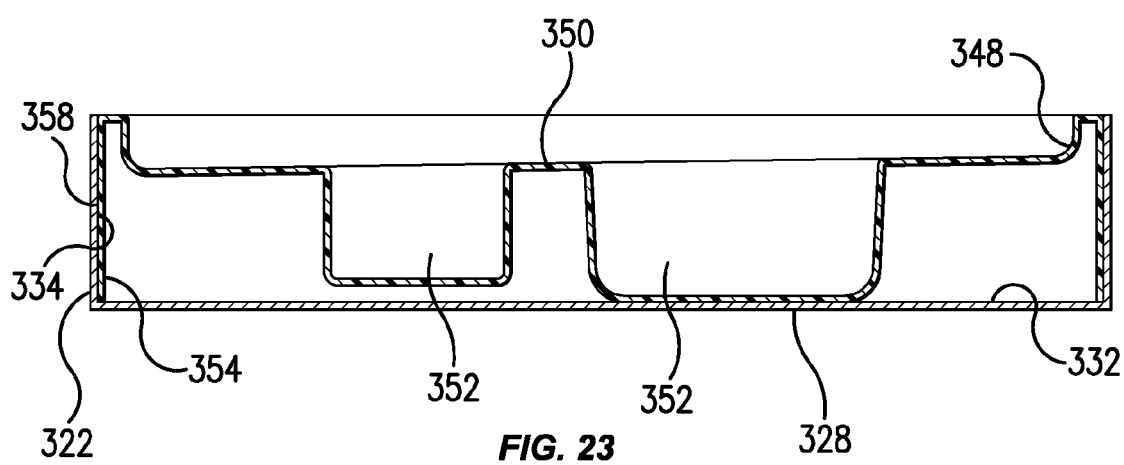
FIG. 23 shows a cross-sectional view of an assembled packaging insert and a base box according to an embodiment.

FIG. 23 shows a cross-sectional view of an assembled base box 320 and packaging insert 340 according to an embodiment. As shown in FIG. 23, base box 320 may receive the entire packaging insert 340. When assembled, at least a portion of first surface 358 of flaps 354 may be in direct contact with cavity side surface 334 of base box 320. In other words, flaps 354 may be parallel to vertical wall 322 of base box 320. Contact between first surface 358 and cavity side surface 334 may be maintained by adhesive 370. Contact and/or adhesive between first surface 358 and cavity side surface 334 may increase the robustness of packaging 300 and minimize undesired movement or shifting of packaging insert 340 and/or product 380 during shipping and handling.

In some embodiments, packaging insert 340 is a single integrally formed piece. In some embodiments, packaging insert may be formed using, for example, injection molding and/or machining. In some embodiments, packaging insert 340 may be made of plastic. Suitable plastics include, for example, polyethylene, polypropylene, polyurethane, polystyrene, etc. The plastic used to make packaging insert 340 may have any color. In some embodiments, packaging insert 340 may be white. In some embodiments, packaging insert 340 may have a dark color, such as black, blue, or red.

The foregoing description, for purposes of explanation, used specific nomenclature to provide a thorough understanding of the described embodiments. However, it will be apparent to one skilled in the art that many of the specific details are not required in order to practice the described embodiments. Thus, the foregoing descriptions of the specific embodiments described herein are presented for the purposes of illustration and description. They are not target to be exhaustive or to limit the embodiments to the precise forms disclosed. It will be apparent to one of ordinary skill in the art that many modifications and variations are possible in view of the above teachings.

The Detailed Description section is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. Packaging for a product, the packaging comprising:
a base box; and
a packaging insert disposed within the base box, the packaging insert comprising:
a top wall having an outer perimeter;
a side wall disposed continuously about the top wall outer perimeter, wherein the top wall and the side wall together define four vertex corners, and wherein the side wall comprises an edge corner extending from each vertex corner;
wherein the side wall comprises:
a plurality of extended portions; and
an abbreviated portion located at each edge corner,
wherein the abbreviated portions have a first maximum height,
wherein the extended portions have second maximum height, and
wherein the first maximum height is less than the second maximum height.

2. The packaging of claim 1, wherein the side wall further comprises a plurality of transition portions, each transition portion located between an abbreviated portion and an extended portion and having a slanted wall connecting the abbreviated portion and extended portion.

3. The packaging of claim 1, wherein the first maximum height is between 2.5 mm and 5.5 mm.

4. The packaging of claim 1, wherein the packaging insert is a single integrally formed piece.

5. The packaging of claim 1, wherein the packaging insert is made of polystyrene.

6. The packaging of claim 1, wherein the side wall, the top wall, and the corners are devoid of stress marks.

7. The packaging of claim 1, wherein the top wall defines a cavity for receiving a product.

8. A packaged product comprising:
a packaging insert comprising:
a top wall having an outer perimeter;
a side wall disposed about the top wall outer perimeter, wherein the top wall and the side wall together define a plurality of vertex corners, and wherein the side wall comprises a plurality of edge corners extending from the vertex corners;
wherein the side wall comprises:
a plurality of extended portions; and
a plurality of abbreviated portions located at the edge corners,
wherein the abbreviated portions have a first maximum height,
wherein the extended portions have second maximum height, and
wherein the first maximum height is less than the second maximum height;
a product in contact with the top wall; and
a base box comprising:
a horizontal wall having an outer perimeter; and
a vertical wall disposed about the horizontal wall outer perimeter,
wherein the horizontal wall and the vertical wall together define a cavity,
wherein the cavity comprises a plurality of edge corners defined by the vertical wall,
wherein the base box is configured to receive at least a portion of the packaging insert, and
wherein the edge corners of the packaging insert are spaced apart from the edge corners of the cavity by no more than 0.75 mm when the packaging insert and the base box are assembled together.

9. The packaged product of claim 8, wherein the edge corners of the packaging insert contact the edge corners of the cavity when the packaging insert and the base box are assembled together.

10. The packaged product of claim 8, wherein the vertical wall has a third maximum height; and
wherein the second maximum height of the extended portions is equal to the third maximum height.

11. The packaged product of claim 8, wherein the vertical wall has a third maximum height; and
wherein the second maximum height of the extended portions is no greater than the third maximum height.

12. The packaged product of claim 8, wherein the edge corners of the packaging insert have the same shape and size as the edge corners of the cavity.

13. The packaged product of claim 8, wherein the side wall of the packaging insert contacts the vertical wall of the base box.

14. The packaged product of claim 8, wherein the side wall of the packaging insert is adhesively bonded to the vertical wall of the base box.

15. The packaged product of claim 8, wherein the base box receives the entire packaging insert.

16. Packaging for a product comprising:
a base box;
a packaging insert in the base box, the packaging insert comprising:
a top wall having a cavity and an outer perimeter; and
a side wall disposed about the top wall outer perimeter, wherein the top wall and the side wall together define a plurality of vertex corners, wherein the side wall comprises extended portions and abbreviated portions, each abbreviated portion disposed at an edge corner extending from a vertex corner, wherein the abbreviated portions are shorter than the extended portions, and wherein the extended portions have a height equal to a height of an inner side surface of the base box such that a flat portion of the top wall is flush with an upper edge of the base box; and a lid comprising a side wall disposed around the base box and the packaging insert.

17. The packaging of claim 16, wherein radii of the edge corners of the packaging insert differ from radii of interior edge corners of the base box by less than 2 mm.

18. The packaging of claim 16, wherein the edge corners of the packaging insert are spaced apart from interior edge corners of the base box by no more than 0.75 mm.

19. The packaging of claim 16, wherein a portion of the top wall forming the cavity is coupled to or in contact with a bottom surface of the base box.

20. The packaging of claim 16, wherein the edge corners of the packaging insert have the same shape and size as interior edge corners of the base box.

21. The packaging of claim 16, wherein the side wall of the packaging insert is coupled to or in contact with a vertical wall of the base box.

22. The packaging of claim 16, wherein the entire packaging insert is disposed within the base box.

23. The packaging of claim 16, wherein the side wall of the packaging insert is adhesively coupled to the inner side surface of the base box.

24. The packaging of claim 16, wherein the side wall of the packaging insert is a continuous side wall disposed about the top wall outer perimeter.

* * * * *